United States Patent
Benjamin et al.

(10) Patent No.: US 11,122,388 B2
(45) Date of Patent: Sep. 14, 2021

(54) METHOD AND SYSTEM FOR CONTAINER LOCATION ANALYSIS

(71) Applicant: Compology, Inc., San Francisco, CA (US)

(72) Inventors: Tyler Benjamin, San Francisco, CA (US); Justin Armstrong, San Francisco, CA (US)

(73) Assignee: Compology, Inc., San Francisco, CA (US)

( * ) Notice: Subject to any disclaimer, the term of this patent is extended or adjusted under 35 U.S.C. 154(b) by 0 days.

(21) Appl. No.: 17/013,478

(22) Filed: Sep. 4, 2020

(65) Prior Publication Data

US 2020/0404449 A1 Dec. 24, 2020

Related U.S. Application Data

(63) Continuation of application No. 16/845,997, filed on Apr. 10, 2020, now Pat. No. 10,798,522.
(Continued)

(51) Int. Cl.
*H04W 24/00* (2009.01)
*H04W 4/021* (2018.01)
(Continued)

(52) U.S. Cl.
CPC .......... *H04W 4/022* (2013.01); *G06K 9/6218* (2013.01); *G06Q 10/087* (2013.01); *H04W 4/023* (2013.01); *H04W 4/029* (2018.02); *H04M 1/724* (2021.01); *H04M 1/72403* (2021.01); *H04W 88/02* (2013.01)

(58) Field of Classification Search
CPC ..... H04W 4/022; H04W 4/029; H04W 88/02; H04W 4/023; G06K 9/6218; G06Q 10/087; H04M 1/72519; H04M 1/72522
See application file for complete search history.

(56) References Cited

U.S. PATENT DOCUMENTS

| 4,485,831 A | 12/1984 | Ungerleider |
| 4,646,793 A | 3/1987 | Sherratt |

(Continued)

FOREIGN PATENT DOCUMENTS

| CN | 101482742 B | 8/2011 |
| EP | 2284104 A1 | 2/2011 |

(Continued)

OTHER PUBLICATIONS

Vicentini et al. Sensorized waste collection container for content estimation and collection optimization. Waste Management 29 (2009) [retrieved on Oct. 29, 2014]. Retrieved from the Internet: pp. 1467-1472.
(Continued)

*Primary Examiner* — Danh C Le
(74) *Attorney, Agent, or Firm* — Jeffrey Schox; Samuel Rosenthal

(57) ABSTRACT

A method for container location analysis, preferably including one or more of: determining a candidate geofence, determining a set of geofences, and/or adjusting geofence positions. A system for fill level determination, preferably including a computing system, and optionally including one or more containers and/or one or more location sensors associated with each container.

21 Claims, 17 Drawing Sheets

Related U.S. Application Data

(60) Provisional application No. 62/832,783, filed on Apr. 11, 2019.

(51) Int. Cl.

| | | |
|---|---|---|
| *H04W 4/02* | (2018.01) | |
| *G06K 9/62* | (2006.01) | |
| *G06Q 10/08* | (2012.01) | |
| *H04W 4/029* | (2018.01) | |
| *H04W 88/02* | (2009.01) | |
| *H04M 1/724* | (2021.01) | |
| *H04M 1/72403* | (2021.01) | |

(56) References Cited

U.S. PATENT DOCUMENTS

| | | | |
|---|---|---|---|
| 4,926,879 | A | 5/1990 | Sevrain et al. |
| 5,257,577 | A | 11/1993 | Clark |
| 5,299,493 | A | 4/1994 | Durbin et al. |
| 5,609,193 | A | 3/1997 | Steckler |
| 5,708,424 | A | 1/1998 | Orlando et al. |
| 5,812,060 | A | 9/1998 | Despain et al. |
| 5,927,142 | A | 7/1999 | Mercer |
| 5,964,258 | A | 10/1999 | Schoenbauer |
| 6,123,017 | A | 9/2000 | Little et al. |
| 6,125,213 | A | 9/2000 | Morimoto |
| 6,272,466 | B1 | 8/2001 | Harada et al. |
| 6,369,715 | B2 | 4/2002 | Bennett et al. |
| 6,561,085 | B1 | 5/2003 | Durbin et al. |
| 6,822,565 | B2 | 11/2004 | Thomas et al. |
| 6,951,615 | B2 | 10/2005 | Tripodi et al. |
| 7,032,820 | B2 | 4/2006 | Kreiner et al. |
| 7,313,464 | B1 | 12/2007 | Perreault et al. |
| 7,421,112 | B2 | 9/2008 | Calver et al. |
| 7,423,541 | B2 | 9/2008 | Miller |
| 7,441,569 | B2 | 10/2008 | Lease |
| 7,728,730 | B2 | 6/2010 | Langlois et al. |
| 7,853,142 | B2 | 12/2010 | Meyers et al. |
| 7,979,146 | B2 | 7/2011 | Ullrich et al. |
| 7,999,688 | B2 | 8/2011 | Healey et al. |
| 8,068,025 | B2 | 11/2011 | Devenyi et al. |
| 8,185,277 | B2 | 5/2012 | Flood et al. |
| 8,339,269 | B2 | 12/2012 | Sherron |
| 8,565,536 | B2 | 10/2013 | Liu |
| 8,620,393 | B2 * | 12/2013 | Bornstein ............. G01S 5/0205 |
| | | | 455/574 |
| 8,754,757 | B1 | 6/2014 | Ullrich et al. |
| 9,019,087 | B2 | 4/2015 | Bakircioglu et al. |
| 9,298,260 | B2 | 3/2016 | Karaoguz et al. |
| 9,301,094 | B2 * | 3/2016 | Jajoo ................. H04W 4/02 |
| 9,352,887 | B2 | 5/2016 | Poss et al. |
| 9,443,410 | B1 | 9/2016 | Constien |
| 9,905,090 | B2 | 2/2018 | Ullrich et al. |
| 9,952,600 | B2 | 4/2018 | Gurin |
| 10,064,007 | B1 | 8/2018 | Deluca et al. |
| 10,405,133 | B1 * | 9/2019 | Merjanian ................. H04B 7/02 |
| 10,416,311 | B2 * | 9/2019 | Huang ................... H04W 4/021 |
| 10,559,208 | B1 * | 2/2020 | McAlpine ........... E01C 19/1068 |
| 10,621,873 | B1 | 4/2020 | Spiel et al. |
| 10,642,362 | B2 | 5/2020 | Eagleman et al. |
| 10,798,522 | B1 | 10/2020 | Benjamin et al. |
| 2002/0108507 | A1 | 8/2002 | May et al. |
| 2004/0129781 | A1 | 7/2004 | Kreiner et al. |
| 2004/0199401 | A1 | 10/2004 | Wagner et al. |
| 2005/0080520 | A1 | 4/2005 | Kline et al. |
| 2005/0083197 | A1 | 4/2005 | Glenn et al. |
| 2005/0126958 | A1 | 6/2005 | Bohlig et al. |
| 2006/0196937 | A1 | 9/2006 | Kreiner et al. |
| 2006/0261964 | A1 | 11/2006 | Maetzke |
| 2007/0041600 | A1 | 2/2007 | Zachman |
| 2007/0133980 | A1 | 6/2007 | Meyers et al. |
| 2007/0260466 | A1 | 11/2007 | Casella et al. |
| 2008/0031525 | A1 | 2/2008 | Yamaguchi |
| 2008/0061125 | A1 | 3/2008 | Langlois et al. |
| 2008/0061977 | A1 | 3/2008 | Maruca et al. |
| 2008/0140422 | A1 | 6/2008 | Hovestadt et al. |
| 2009/0014363 | A1 | 1/2009 | Gonen et al. |
| 2009/0161907 | A1 | 6/2009 | Healey et al. |
| 2009/0321511 | A1 | 12/2009 | Browne |
| 2010/0001867 | A1 | 1/2010 | Rodrigue et al. |
| 2010/0017127 | A1 * | 1/2010 | Pepitone ............. G08G 5/0078 |
| | | | 701/301 |
| 2010/0042940 | A1 | 2/2010 | Monday et al. |
| 2010/0069035 | A1 | 3/2010 | Johnson |
| 2010/0092089 | A1 | 4/2010 | Wilson et al. |
| 2010/0217715 | A1 | 8/2010 | Lipcon |
| 2010/0287073 | A1 | 11/2010 | Kocis et al. |
| 2010/0312601 | A1 | 12/2010 | Lin |
| 2011/0000295 | A1 | 1/2011 | Kritlow |
| 2011/0054979 | A1 | 3/2011 | Cova et al. |
| 2011/0063208 | A1 | 3/2011 | Van et al. |
| 2011/0137812 | A1 | 6/2011 | Sherga |
| 2011/0148634 | A1 * | 6/2011 | Putz ....................... G08B 21/22 |
| | | | 340/541 |
| 2011/0175739 | A1 | 7/2011 | McFeeters |
| 2012/0010746 | A1 | 1/2012 | Sundholm |
| 2012/0192646 | A1 | 8/2012 | Arnold et al. |
| 2012/0209783 | A1 | 8/2012 | Smith et al. |
| 2012/0314059 | A1 | 12/2012 | Hoffmann et al. |
| 2013/0006522 | A1 | 1/2013 | Vellaikal et al. |
| 2013/0096731 | A1 | 4/2013 | Tamari et al. |
| 2013/0180892 | A1 | 7/2013 | Marrapodi et al. |
| 2013/0218456 | A1 | 8/2013 | Zelek et al. |
| 2013/0278067 | A1 | 10/2013 | Poss et al. |
| 2013/0295970 | A1 * | 11/2013 | Sheshadri ............. H04W 4/021 |
| | | | 455/456.6 |
| 2013/0345969 | A1 | 12/2013 | Udeshi et al. |
| 2014/0005039 | A1 | 1/2014 | Ohishi et al. |
| 2014/0050397 | A1 | 2/2014 | Badholm et al. |
| 2014/0074298 | A1 | 3/2014 | Jambeck et al. |
| 2014/0214697 | A1 | 7/2014 | McSweeney |
| 2014/0229501 | A1 | 8/2014 | Josefiak |
| 2014/0266698 | A1 | 9/2014 | Hall et al. |
| 2014/0351328 | A1 * | 11/2014 | Woods .................. H04W 4/021 |
| | | | 709/204 |
| 2015/0081212 | A1 * | 3/2015 | Mitchell ............... G01C 21/367 |
| | | | 701/454 |
| 2015/0088792 | A1 | 3/2015 | O'Neill et al. |
| 2015/0148077 | A1 * | 5/2015 | Jelle ..................... H04W 4/029 |
| | | | 455/456.3 |
| 2015/0186497 | A1 * | 7/2015 | Patton ...................... G06F 16/27 |
| | | | 707/740 |
| 2015/0271126 | A1 | 9/2015 | Menayas et al. |
| 2015/0271639 | A1 * | 9/2015 | Ziskind .................. H04W 4/021 |
| | | | 455/456.1 |
| 2015/0310606 | A1 | 10/2015 | Shreve et al. |
| 2015/0339864 | A1 | 11/2015 | Herron |
| 2015/0348252 | A1 | 12/2015 | Mask |
| 2016/0003627 | A1 | 1/2016 | Bonhomme |
| 2016/0026253 | A1 | 1/2016 | Bradski et al. |
| 2016/0195602 | A1 | 7/2016 | Meadow |
| 2016/0212590 | A1 * | 7/2016 | DeCorte ............. G06Q 10/1095 |
| 2016/0266258 | A1 | 9/2016 | Huang et al. |
| 2016/0292862 | A1 | 10/2016 | Mask |
| 2016/0358429 | A1 | 12/2016 | Ullrich et al. |
| 2017/0109027 | A1 | 4/2017 | Snubs et al. |
| 2017/0124643 | A1 | 5/2017 | Haimi et al. |
| 2017/0169673 | A1 | 6/2017 | Billington et al. |
| 2017/0206889 | A1 | 7/2017 | Lev-Tov et al. |
| 2017/0223499 | A1 | 8/2017 | Jernigan |
| 2017/0289754 | A1 * | 10/2017 | Anderson ............. H04W 4/029 |
| 2017/0353829 | A1 | 12/2017 | Kumar et al. |
| 2017/0366616 | A1 | 12/2017 | Rodrigues Nascimento et al. |
| 2018/0027371 | A1 * | 1/2018 | Austraat ........... H04M 1/72572 |
| | | | 455/456.3 |
| 2018/0075108 | A1 | 3/2018 | Park et al. |
| 2018/0082279 | A1 | 3/2018 | Vasgaard et al. |
| 2018/0108023 | A1 | 4/2018 | Stewart et al. |
| 2018/0165970 | A1 * | 6/2018 | Namgoong ............. G08G 5/045 |
| 2018/0174067 | A1 | 6/2018 | Spiro et al. |
| 2018/0189835 | A1 * | 7/2018 | DeLuca ............. G06Q 30/0246 |
| 2018/0192237 | A1 | 7/2018 | Privitera et al. |
| 2018/0220061 | A1 | 8/2018 | Wang et al. |

(56) References Cited

U.S. PATENT DOCUMENTS

| | | | |
|---|---|---|---|
| 2018/0232767 A1 | 8/2018 | Garg et al. | |
| 2018/0262903 A1* | 9/2018 | Ryan | H04W 4/90 |
| 2018/0268377 A1 | 9/2018 | Mofardin et al. | |
| 2018/0285535 A1 | 10/2018 | Zhu et al. | |
| 2018/0312095 A1 | 11/2018 | Eletrabi | |
| 2018/0338001 A1 | 11/2018 | Pereira Cabral et al. | |
| 2018/0338031 A1 | 11/2018 | Subramanian et al. | |
| 2018/0374046 A1 | 12/2018 | Powers et al. | |
| 2019/0007484 A1 | 1/2019 | Chen et al. | |
| 2019/0026915 A1 | 1/2019 | Seaman et al. | |
| 2019/0102726 A1* | 4/2019 | Ushiki | H04W 4/029 |
| 2019/0164081 A1 | 5/2019 | Deluca et al. | |
| 2019/0295223 A1 | 9/2019 | Shen et al. | |
| 2019/0313204 A1* | 10/2019 | Ayoub | H04W 4/35 |
| 2020/0100052 A1 | 3/2020 | Ellis et al. | |
| 2020/0145783 A1 | 5/2020 | Hanada et al. | |
| 2020/0162842 A1* | 5/2020 | Jones | H04L 61/609 |
| 2020/0252742 A1* | 8/2020 | Yeon | H04W 4/70 |
| 2020/0344567 A1* | 10/2020 | Wirola | H04W 4/021 |
| 2021/0006936 A1 | 1/2021 | Wirola et al. | |

FOREIGN PATENT DOCUMENTS

| | | |
|---|---|---|
| GB | 2386686 A | 9/2003 |
| WO | 2012015664 A1 | 2/2012 |
| WO | 2012164098 A1 | 12/2012 |
| WO | 2014079586 A1 | 5/2014 |

OTHER PUBLICATIONS

Lamba, Harshall, "One Shot Learning with Siamese Networks using Keras", https://towardsdatascience.com/one-shot-learning-with-siamese-networks-using-keras-17f34e75bb3d, dated Jan. 20, 2019.

Gates, Jason, "Fullness Monitoring for Waste-Image-based vs. Ultrasonic Sensors", https://medium.com/#compology/fullness-monitoring-for-waste-image-based-vs-ultrasonic-sensors-29f360bf01e8, dated Jul. 11, 2017.

Karpathy, Andrej, "CS231n Convolutional Neural Networks for Visual Recognition", http://cs231n.github.io/neural-networks-2/#losses.

* cited by examiner

METHOD AND SYSTEM FOR CONTAINER LOCATION ANALYSIS

CROSS-REFERENCE TO RELATED APPLICATIONS

This application is a continuation of U.S. Nonprovisional application Ser. No. 16/845,997 filed 10 Apr. 2020 which claims the benefit of U.S. Provisional Application Ser. No. 62/832,783, filed on 11 Apr. 2019, which is incorporated in its entirety by this reference.

TECHNICAL FIELD

This invention relates generally to the container management field, and more specifically to a new and useful method and system for location analysis in the container management field.

BACKGROUND

Typical methods and systems for container location analysis require location data with reliably high accuracy and/or precision, and/or require additional metadata, to enable determination of useful and/or reliable information. Accordingly, such methods and systems may not be able to rely on location data of low or inconsistent accuracy and/or precision, such as some data received from geopositioning systems. Thus, there is a need in the container management field to create a new and useful method and system for location analysis.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

A method for container location analysis can include one or more of: determining a candidate geofence S100; determining a set of geofences S200; and/or adjusting geofence positions S300. However, the method can additionally or alternatively include any other suitable elements.

Figure 1:
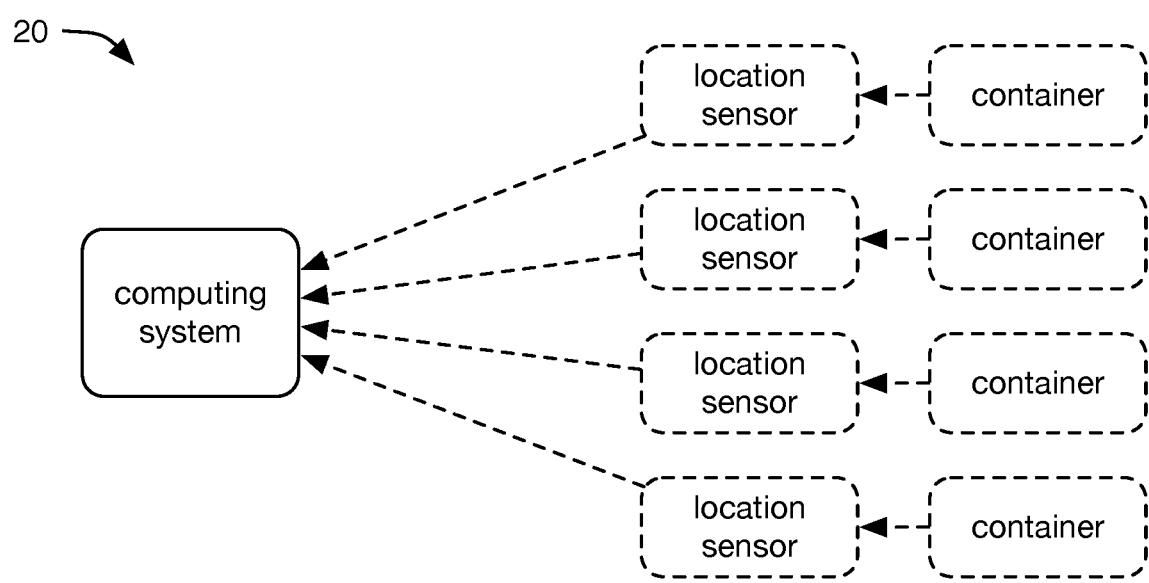
FIG. 1 is a schematic representation of an embodiment of the system.

A system 20 for fill level determination preferably includes a computing system (e.g., remote server), and can additionally or alternatively include one or more containers, one or more location sensors associated with each container, and/or any other suitable elements (e.g., as shown in FIG. 1).

The method is preferably performed using the system 20, but can additionally or alternatively be performed by any other suitable system.

In some embodiments, the method and/or system can enable container location analysis based on location data of low or inconsistent accuracy and/or precision, such as some data received from global navigation satellite systems (GNSSs). For example, the geofences described below can be determined and/or adjusted in manners that are robust to some erroneous location data. However, the method and/or system can additionally or alternatively utilize any other suitable data.

2. System.

The containers can include dumpsters (e.g., front load containers, roll off containers, etc.), shipping containers (e.g., intermodal freight containers, unit load devices, etc.), sections of a vehicle (e.g., land, sea, air, and/or space vehicle) such as vehicle cargo holds, rooms of a structure (e.g., a fixed structure such as a building), and/or any other suitable containers.

Each container is preferably associated with one or more location sensors (e.g., modules associated with one or more GNSSs and/or other geopositioning systems, such as receivers for one or more of GPS, GLONASS, BeiDou, Galileo, etc.; local positioning modules, such as modules enabling techniques such as triangulation, trilateration, multilateration, etc.), preferably location sensors configured to determine the location (e.g., geospatial position) of the container. The location sensor is preferably affixed to the container, but can additionally or alternatively have any other suitable arrangement with respect to the container.

Figure 2A:
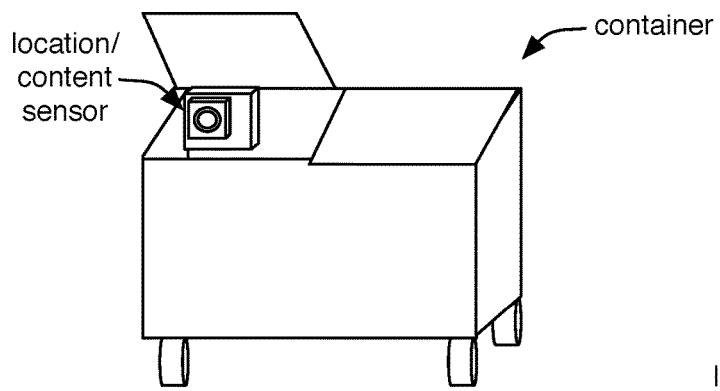
FIGS. 2A-2C are schematic representations of various examples of one or more location sensors coupled to a container.
Figure 2B:
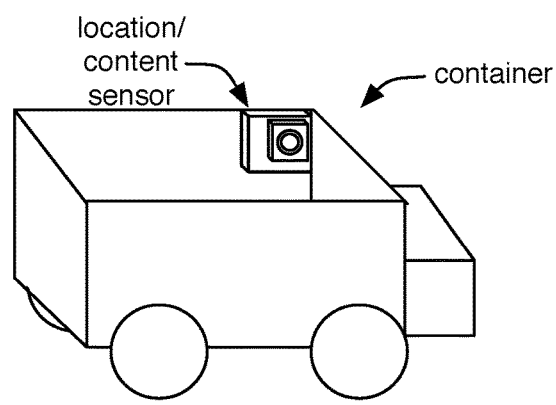
Figure 2C:
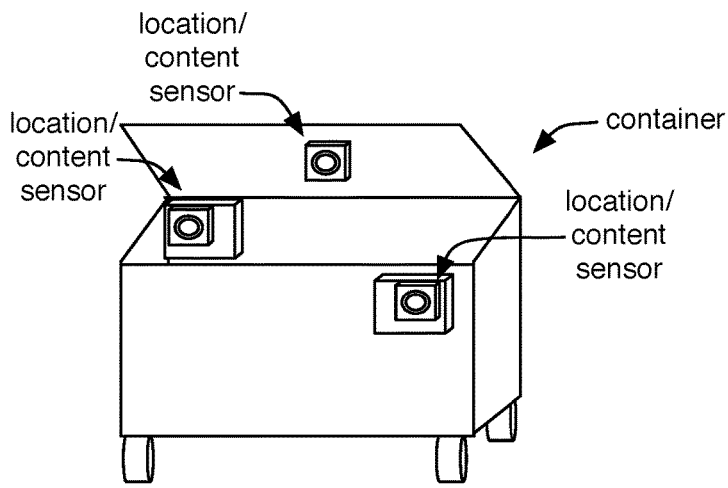

Each container can optionally include one or more content sensors (e.g., integrated with and/or separate from the location sensor). The content sensor is preferably configured to sense (e.g., image) the interior of the container that it is associated with (e.g., image and/or otherwise sense the contents of the container), more preferably configured to sense substantially all of the interior but alternatively configured to image any suitable portion thereof. The content sensor preferably has a fixed position and/or orientation relative to the container (e.g., is mechanically coupled to the container, preferably by a fixed coupling) but can alternatively have any other suitable spatial relationship with respect to the container (e.g., as shown in FIGS. 2A-2C).

The content sensor preferably includes one or more imaging devices. The imaging device is preferably an optical sensor (e.g., camera), but can additionally or alternatively include an ultrasound imaging device and/or any other suitable imaging devices. Examples of optical sensors include a monocular camera, stereocamera, multi-lens or multi-view camera, color camera (e.g., an RGB camera) such as a charge coupled device (CCD) or a camera including a CMOS sensor, grayscale camera, multispectral camera (narrow band or wide band), hyperspectral camera, ultraspectral camera, spectral camera, spectrometer, time of flight camera, high-, standard-, or low-dynamic range cameras, range imaging system (e.g., LIDAR system), active light system (e.g., wherein a light, such as an IR LED, is pulsed and directed at the subject and the reflectance difference measured by a sensor, such as an IR sensor), thermal sensor, infra-red imaging sensor, projected light system, full spectrum sensor, high dynamic range sensor, or any other suitable imaging system. The optical sensor is preferably configured to capture a 2-dimensional or 3-dimensional image, but can alternatively capture any measurement having any other suitable dimension. The image is preferably single, multi-pixel, time-averaged or sum total measurement of the intensity of a signal emitted or reflected by objects within a field of view, but can alternatively be a video (e.g., a set of images or frames), or any other suitable measurement. The image preferably has a resolution (e.g., cycles per millimeter, line pairs per millimeter, lines of resolution, contrast vs. cycles/mm, modulus of the OTF, or any other suitable measure) capable of resolving a 1 cm$^3$ object at a sensor distance of at least 10 feet from the object, but can alternatively have a higher or lower resolution.

The content sensor can optionally include one or more emitters that are configured to emit electromagnetic signals, audio signals, compounds, or any other suitable interrogator that the content sensor is configured to measure. However, the content sensor can additionally or alternatively measure signals from the ambient environment. Examples of sensor-emitter pairs include LIDAR systems, time-of-flight systems, ultrasound systems, radar systems, X-ray systems, and/or any other suitable systems. In embodiments in which the content sensor includes an emitter, the content sensor can optionally include a reference sensor that measures the ambient environment signals (e.g., wherein the content sensor measurement can be corrected by the reference sensor measurement).

The content sensor can optionally include a lens that functions to adjust the optical properties of the incident signal on the sensor. For example, the optical sensor can include a fish-eye lens to broaden the area monitored by the optical sensor, wherein the resultant distortion is known and can be adjusted for during image processing. However, the lens can be a wavelength filter, polarizing filter, or any other suitable lens. The content sensor can additionally or alternatively include a physical or digital filter, such as a noise filter that corrects for interferences in the measurement.

The location sensors and/or content sensors can optionally include one or more communication modules. The communication module preferably functions to communicate data from the content sensor to a second system (e.g., the computing system). The data can be measurements from the location sensor (e.g., location measurements), measurements from the content sensor (and/or any other suitable components), processed measurements, instructions, pickup requests, and/or any other suitable data. The second system can be a device, server system, or any other suitable computing system. The second system can be remote or wired to the communication system. Examples of the second system include a mobile device (e.g., smartphone, tablet, computer), server system, or any other suitable computing system. The communication system can be a wireless or wired communication system. The communication system can be a cellular, WiFi, Zigbee, Z-Wave, near-field communication system (e.g., Bluetooth, RF, NFC, etc.), Ethernet, powerline communication, or any other suitable communication system. The communication system is preferably operable in a standby or off mode, wherein the communication system consumes power at a rate less than a threshold rate, and an on or communication mode, wherein the communication system consumes power at a rate required to communicate data. However, the communication system can be operable in any other suitable mode.

The location sensors and/or content sensors can optionally include one or more auxiliary sensors, such as IMU sensors (e.g., accelerometer, gyroscope, magnetometer, etc.), weight sensors, audio sensors, and/or any other suitable auxiliary sensors.

However, the system 20 can additionally or alternatively include any other suitable elements in any suitable arrangement.

3. Method.

3.1 Determining a Candidate Geofence.

Determining a candidate geofence S100 preferably functions to determine a region associated with one or more containers. S100 is preferably performed based on a location dataset (e.g., dataset received from one or more location sensors, such as posts from a GPS receiver), such as shown by way of example in FIG. 4A. The location dataset is preferably associated with a single container, but can alternatively include location data from multiple containers, location data from all containers of the system, and/or any other suitable location data. The location dataset is preferably restricted to a particular time interval (e.g., 1, 2, 4, 7, 15, 30, 0.1-1, 1-5, 3-10, 10-30, or more than 30 days; 0.5, 1, 2, 3, 5, 8, 4-6, or 6-10 weeks; etc.), such as including only data sampled during the time interval and/or data received (e.g., at the computing system) during the time interval. The dataset preferably uses the most recent data available (e.g., the data from the most recent week), such as wherein the time interval ends substantially at the present time (e.g., on the present day) and/or ends at the time of the most-recent data point (e.g., most recently collected and/or most recently received). Alternatively, the time interval can be a past interval (e.g., the interval preceding the most recent interval, an interval ending before the present time and/or excluding the most-recent data point(s), etc.). However, the location dataset can additionally or alternatively include any other suitable data (e.g., data associated with any other suitable containers and/or locations, data associated with any other suitable times, etc.).

Figure 3:
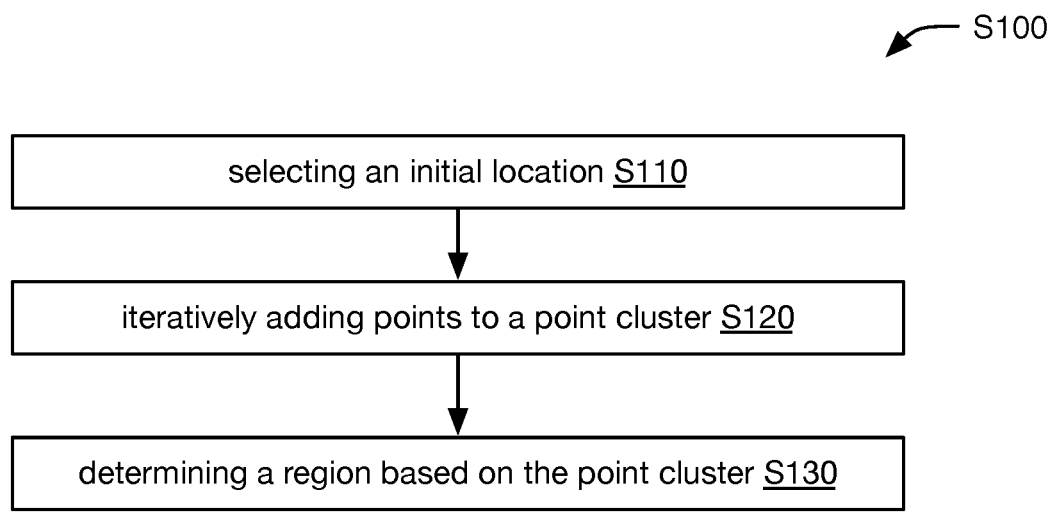
FIG. 3 is a flowchart representation of an embodiment of a first element of the method.
Figure 4A:
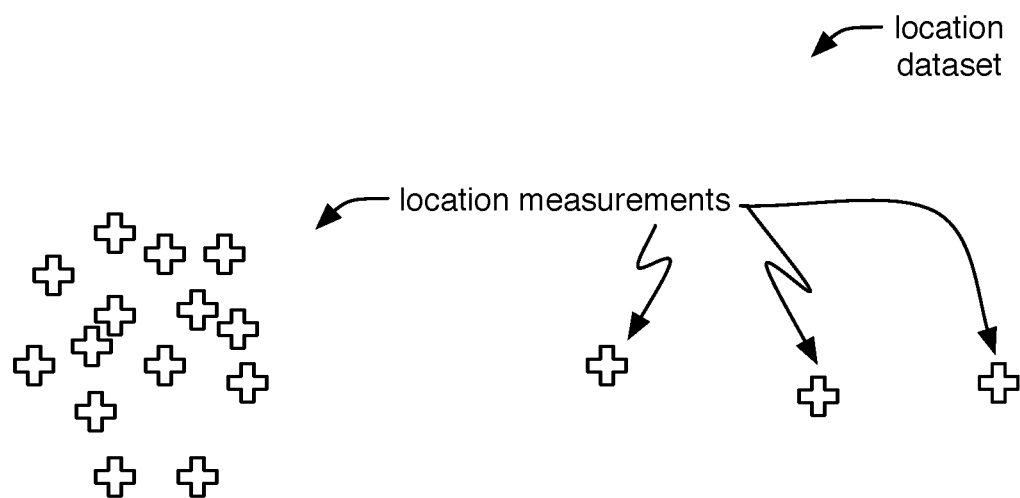
FIG. 4A is a schematic representation of a first example of a location dataset.
Figure 4B:
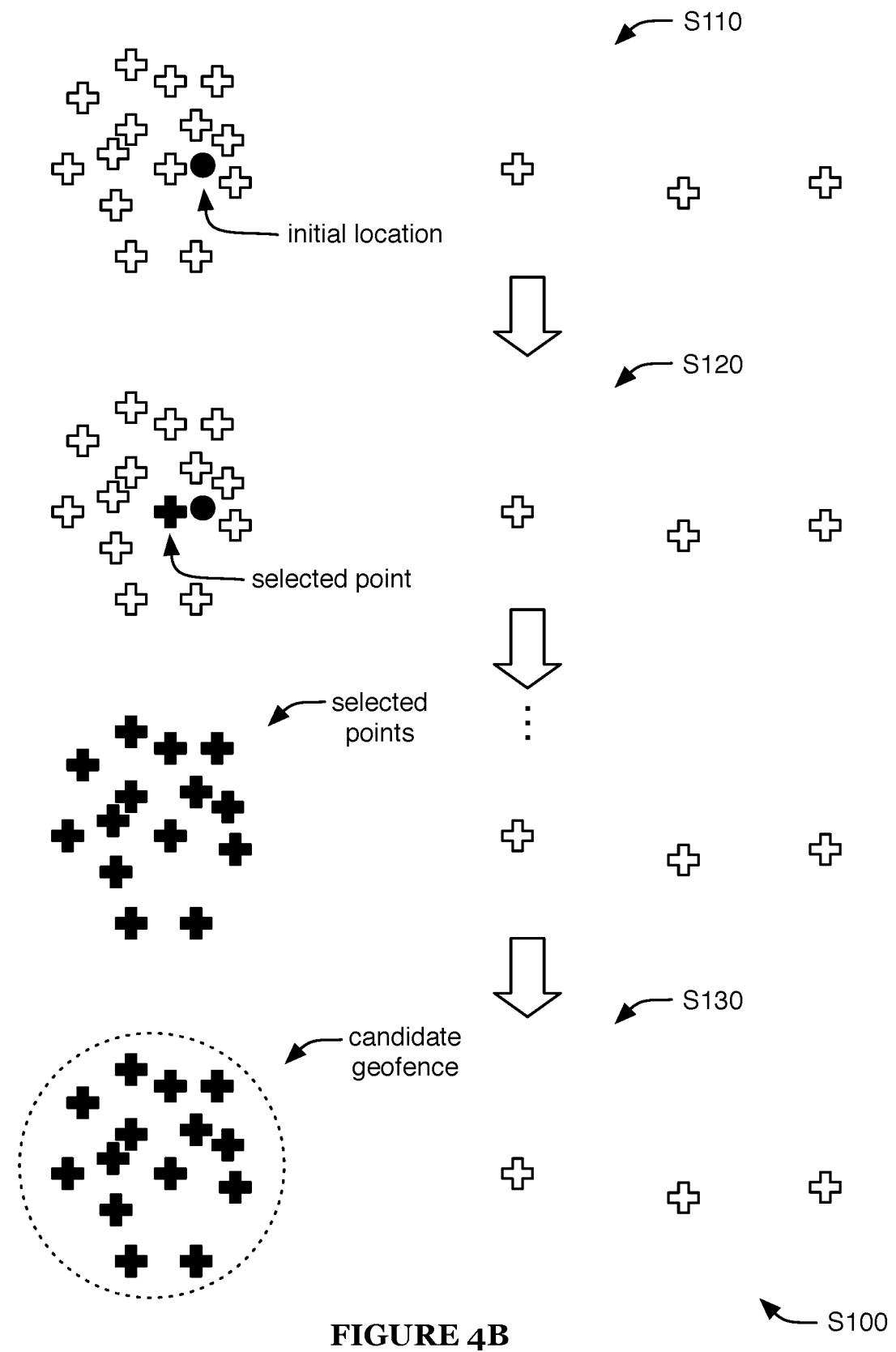
FIG. 4B is a schematic representation of an example of the first element of the method.

S100 preferably includes: selecting an initial location Silo; iteratively adding points to a point cluster S120; and/or determining a region based on the point cluster S130 (e.g., as shown in FIGS. 3, 4A, and 4B). However, S100 can additionally or alternatively include determining the candidate geofence in any other suitable manner.

Selecting an initial location S110 preferably includes determining a central position (e.g., measure of central tendency) associated with the dataset. The central position is preferably a centroid (e.g., spatial mean), but can additionally or alternatively include one or more spatial medians, medoids, and/or other measures of central tendency. The initial location is preferably selected based on the central position (but can additionally or alternatively be selected in any other suitable manner). In some embodiments, the initial location is the central position. In other embodiments, the initial location is selected based on proximity to the central position (e.g., closest point in the location dataset to the central position; measure of central tendency associated with a subset of the points in the location dataset, such as wherein the subset includes a threshold number of points closest to the central position and/or includes all points within a threshold distance of the central position; etc.). However, the initial location can include any other suitable positions.

Iteratively adding points (e.g., from the dataset) to a point cluster S120 preferably includes selecting a point (e.g., location measurement) and comparing the distance to the point with one or more thresholds, and can optionally include adding the point to the cluster and/or repeating S120. S120 is preferably repeated (e.g., based on the point cluster including all points added from previous iterations of S120) until one or more termination criteria are met. For example, S120 can include determining whether to add a point to the point cluster based on one or more point addition criteria (e.g., associated with a distance threshold such as described below, etc.), and the termination criteria can be met if no points are added to the point cluster during an iteration (i.e., S120 repeats until no more points are being added to the point cluster).

Selecting the point preferably includes selecting the closest point to the cluster (e.g., of the set of points not yet included in the cluster), more preferably also determining the associated distance from the cluster to the selected point. The selected point is preferably the point closest to the central position (e.g., centroid) of the current cluster, but can additionally or alternatively be closest to the initial location (e.g., location selected in Silo), closest to any point of the cluster, and/or closest to the cluster according to any other suitable metric.

S120 preferably includes comparing the distance of the selected point with one or more thresholds. For example, the thresholds can include an absolute and/or predefined threshold (e.g., 1, 2, 5, 10, 20, 50, 100, 1-5, 3-10, 5-20, 10-30, or 20-100 meters, etc.). Additionally or alternatively, the thresholds can include a variable threshold such as a percentage of a typical cluster distance (e.g., no less than 100%, such as 100, 110, 120, 130, 150, 200, 250, 100-130, 115-150, or 150-300%, etc.; less than or equal to 100%, such as 100, 99, 98, 95, 90, 85, 75, 100-95, 95-80, or 80-65%, etc.), wherein the typical cluster distance can be an average distance between each point and the central position, an average distance between each pair of points of the cluster, and/or any other suitable distance. However the selected point distance can additionally or alternatively be compared to any other suitable threshold distances. If the distance to the selected point is less than or equal to the threshold (e.g., satisfying the point addition criteria), the point is preferably added to the cluster and S120 is preferably repeated (e.g., the termination criteria are not satisfied), which can enable possible addition of more points to the cluster. Alternatively, if the distance to the selected point is greater than the threshold (e.g., the point addition criteria are not satisfied), the selected point is preferably not added to the cluster, and performance of S100 preferably proceeds to S130 (e.g., the termination criteria are satisfied) rather than repeating S120.

Determining a region based on the point cluster S130 preferably functions to determine the shape and/or position of the candidate geofence. In a first embodiment, the region is centered at a central position of the points of the cluster (e.g., centroid and/or any other suitable central position, such as described above regarding S110). In a first example of this embodiment, the region is a circle, preferably with a radius sufficient to encompass all points of the cluster ("minimum sufficient radius"). The radius can optionally exceed the minimum sufficient radius (e.g., by a predetermined absolute distance, by a predetermined percentage of the minimum sufficient radius, etc.). Alternatively, the radius can be selected to exclude no more than a threshold fraction or number of points of the cluster, to include at least a threshold fraction or number of points of the cluster, and/or to include any other suitable points in the determined region.

In a second embodiment, the region is determined such that it encompasses a set of points. The set of points preferably includes all points of the point cluster. However, the set can alternatively include only a subset of the point cluster, such as a threshold number or fraction of the points. For example, the region can be determined based on one or more optimization criteria (e.g., minimize area, minimize perimeter, maximize overlap with central regions of the point cluster, etc.) and/or constraints (e.g., encompass at least a threshold number or fraction of the points, encompass a specific point or set of points, encompass a measure of central tendency of the point cluster, geometrical constraints such as shape type and/or minimum area:perimeter ratio, etc.). The set preferably does not include points not in the point cluster, but can additionally or alternatively include any other suitable points. In a first example of this embodiment, the region is determined based on (e.g., is equivalent to; is a transform of, such as a dilation or contraction of; etc.) a convex hull of the set of points. In a second example, the region is determined based on (e.g., is equivalent to; is a transform of, such as a dilation, contraction, boundary dilation, and/or boundary erosion of; etc.) a shape, preferably a circle, that circumscribes the set of points. In variations in which the region is generated based on a boundary dilation of the enclosing shape (e.g., convex hull, circumscribed shape, etc.), the boundary can be dilated by a predetermined absolute distance, by a predetermined percentage of a length metric of the enclosing shape, and/or by any other suitable amount.

Optionally, S130 can include determining the region only if the cluster has at least a threshold number of points, such a minimum number (e.g., 2, 3, 4, 5, 6, 8, 12, 15, 20, 1-3, 4-6, 7-10, or 10-25 points, etc.), a minimum percentage of total points in the dataset (e.g., 1, 2, 5, 10, 20, 50, 1-5, 5-15, 15-35, or 35-70%, etc.), and/or any other suitable minimum threshold. In such examples, if the cluster does not have at least the threshold number of points, S130 preferably includes determining no candidate geofence for the data set.

However, S100 can additionally alternatively include determining a cluster of points in any other suitable manner and determining a region based on that cluster and/or determining a candidate geofence in any other suitable manner.

3.2 Determining a Set of Geofences.

Determining a set of geofences S200 preferably functions to determine a set of locations associated with a set of containers (e.g., all containers within a municipality, service region, and/or other geographical area). S200 is preferably performed for a large number of containers (e.g., 100, 500, 1000, 2000, 5000, 20-200, 100-400, 200-1000, 500-2000, 1000-5000, or 2000-10,000 containers, etc.), but can additionally or alternatively be performed for any other suitable number of containers. S200 is preferably performed based on a location dataset associated with each container (e.g., time series of container locations, such as a time series of GPS posts associated with each container), and can additionally or alternatively be performed based on other location data and/or any other suitable information.

Figure 5A:
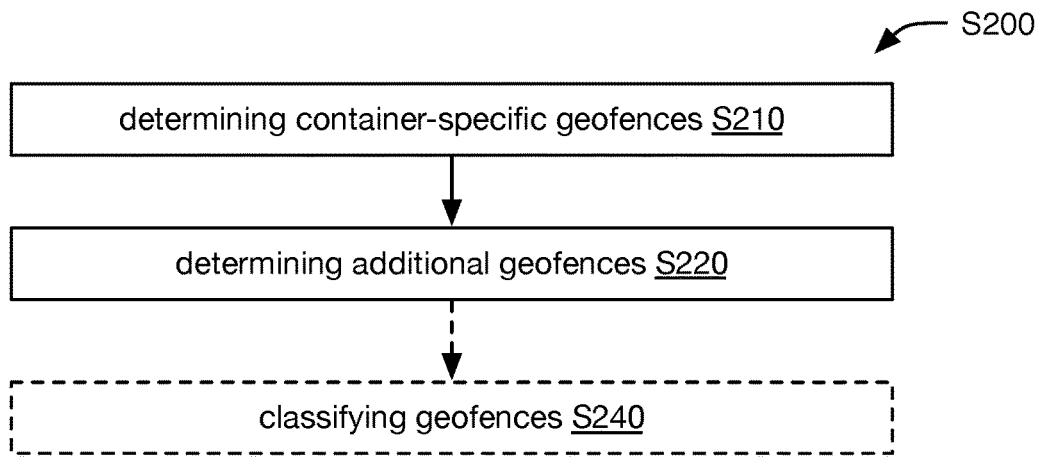
FIGS. 5A-5B are flowchart representations of an embodiment and a variation, respectively, of a second element of the method.
Figure 5B:
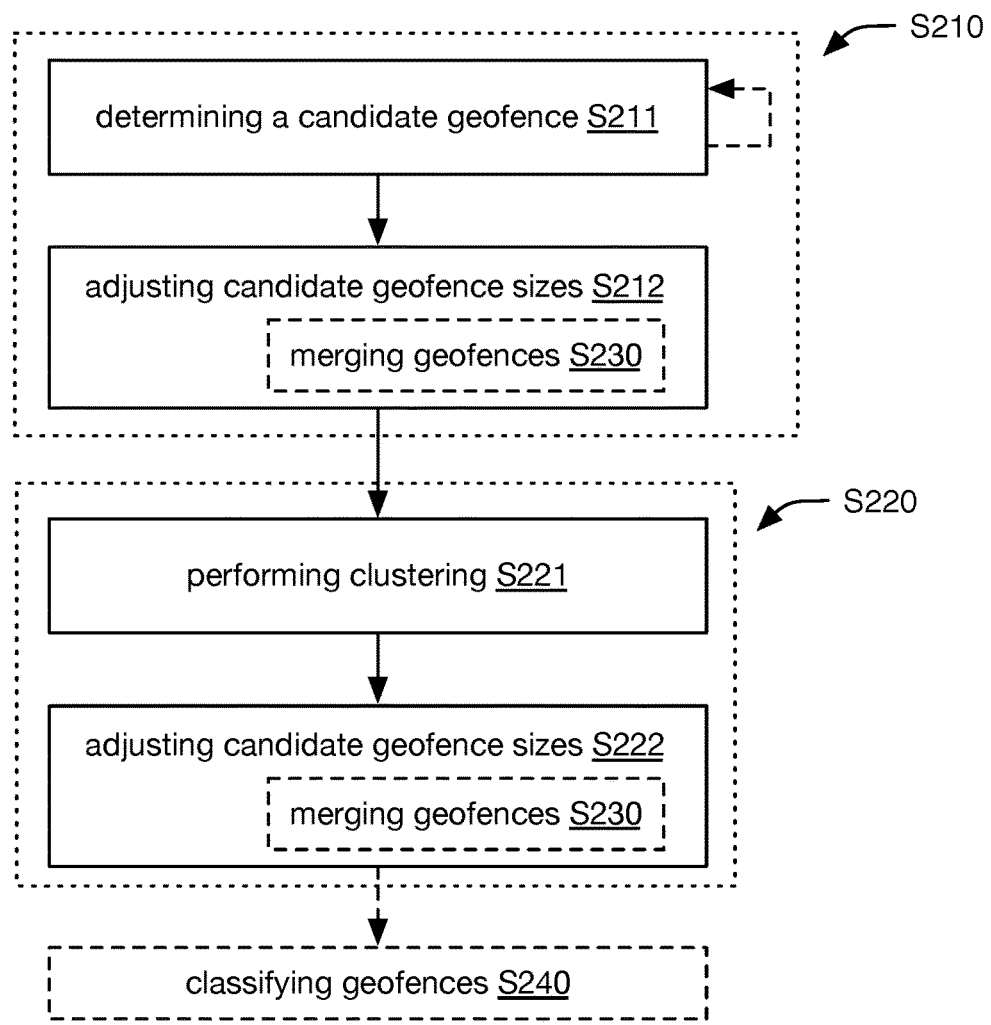
Figure 6A:
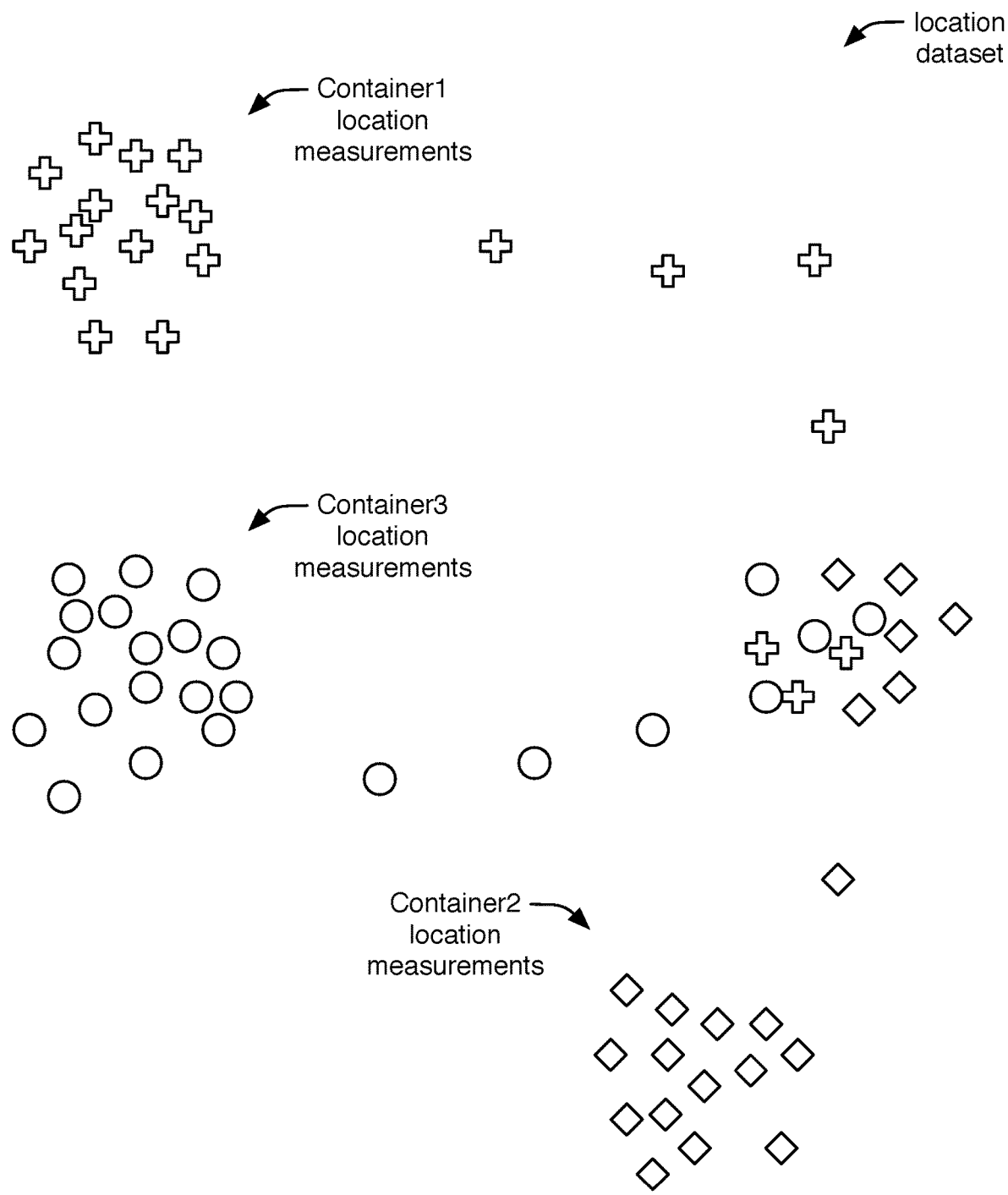
FIG. 6A is a schematic representation of a second example of a location dataset.
Figure 6B:
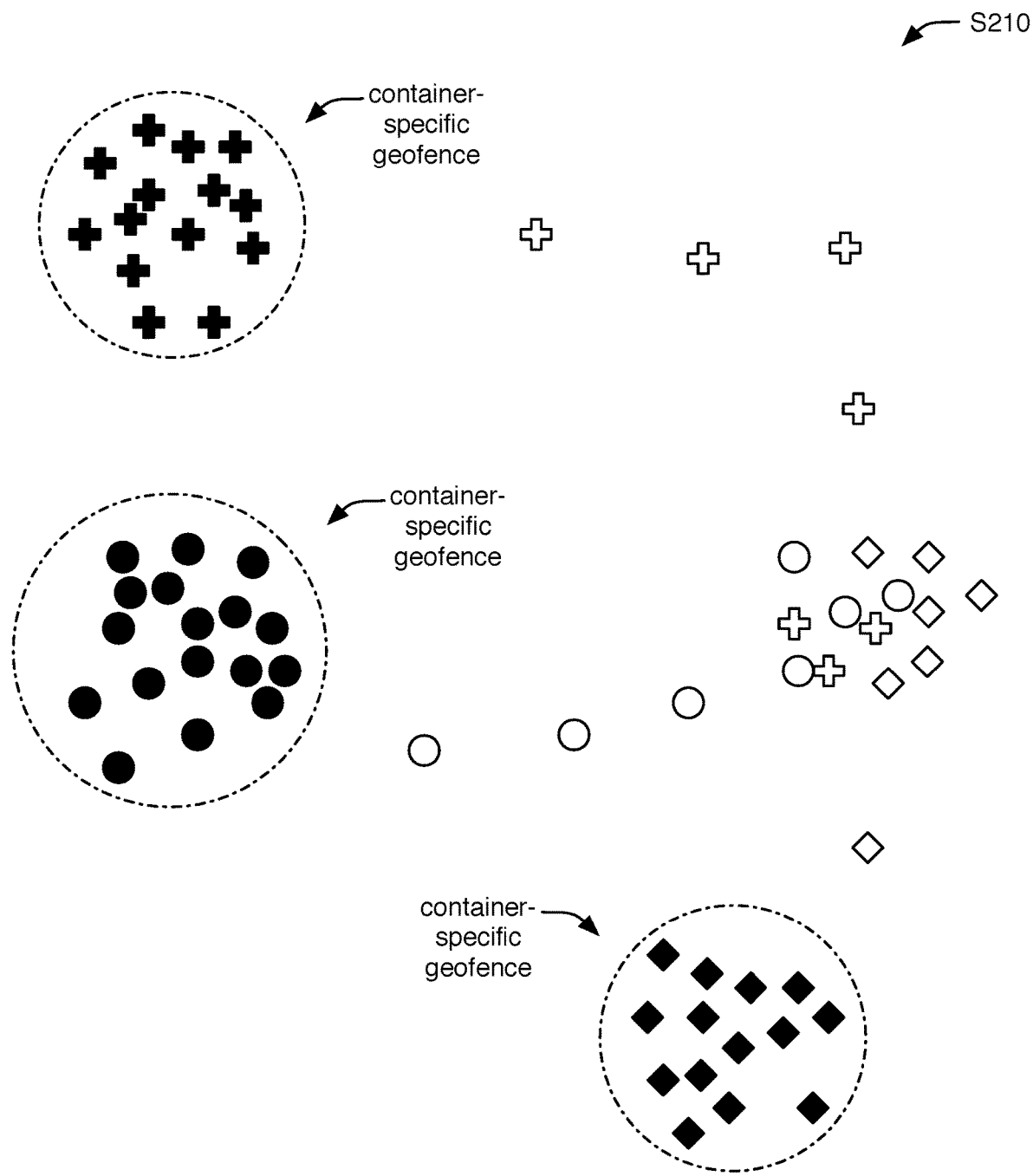
FIGS. 6B-6D are schematic representations of various portions of an example of the second element of the method.
Figure 6C:
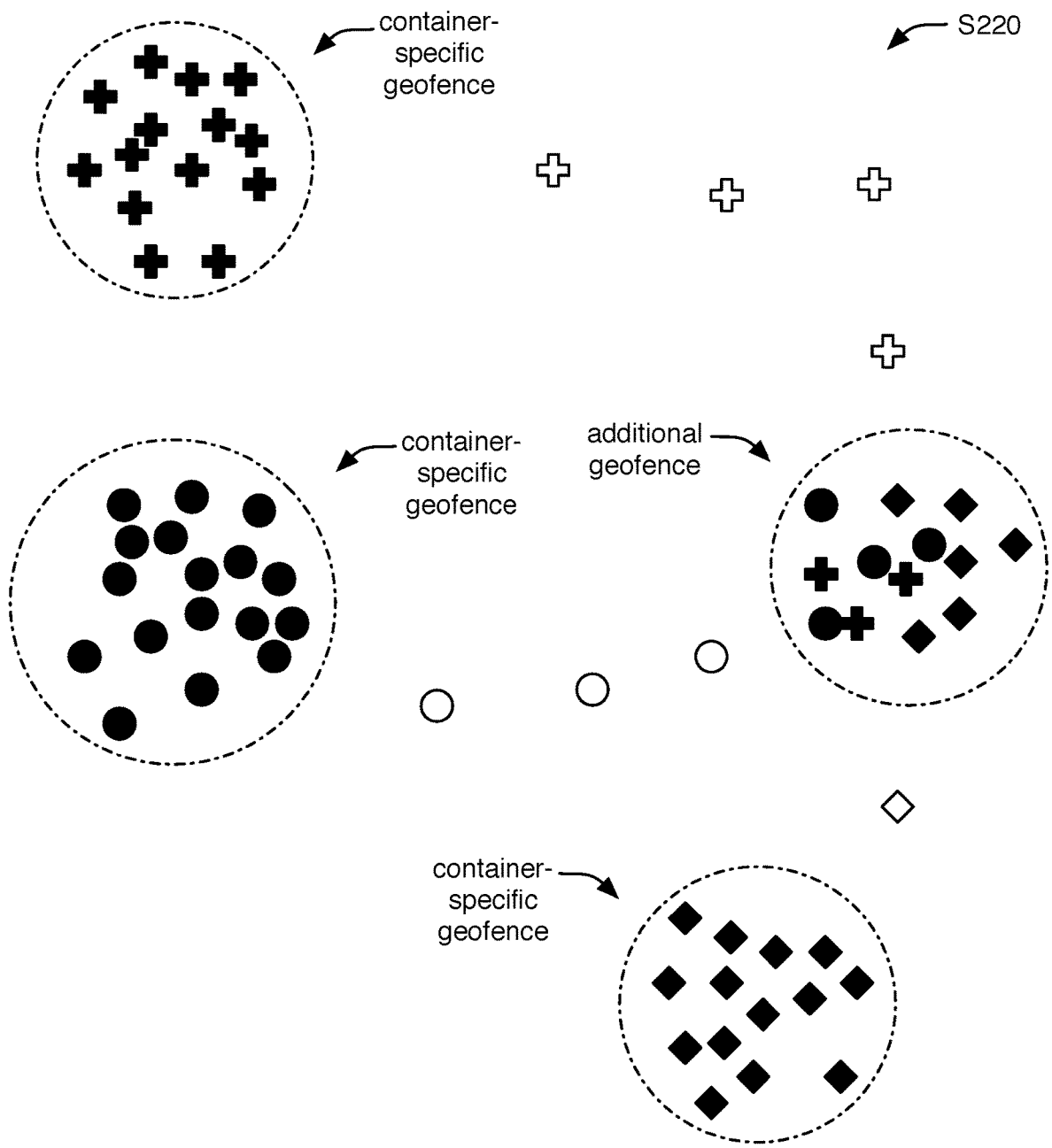
Figure 6D:
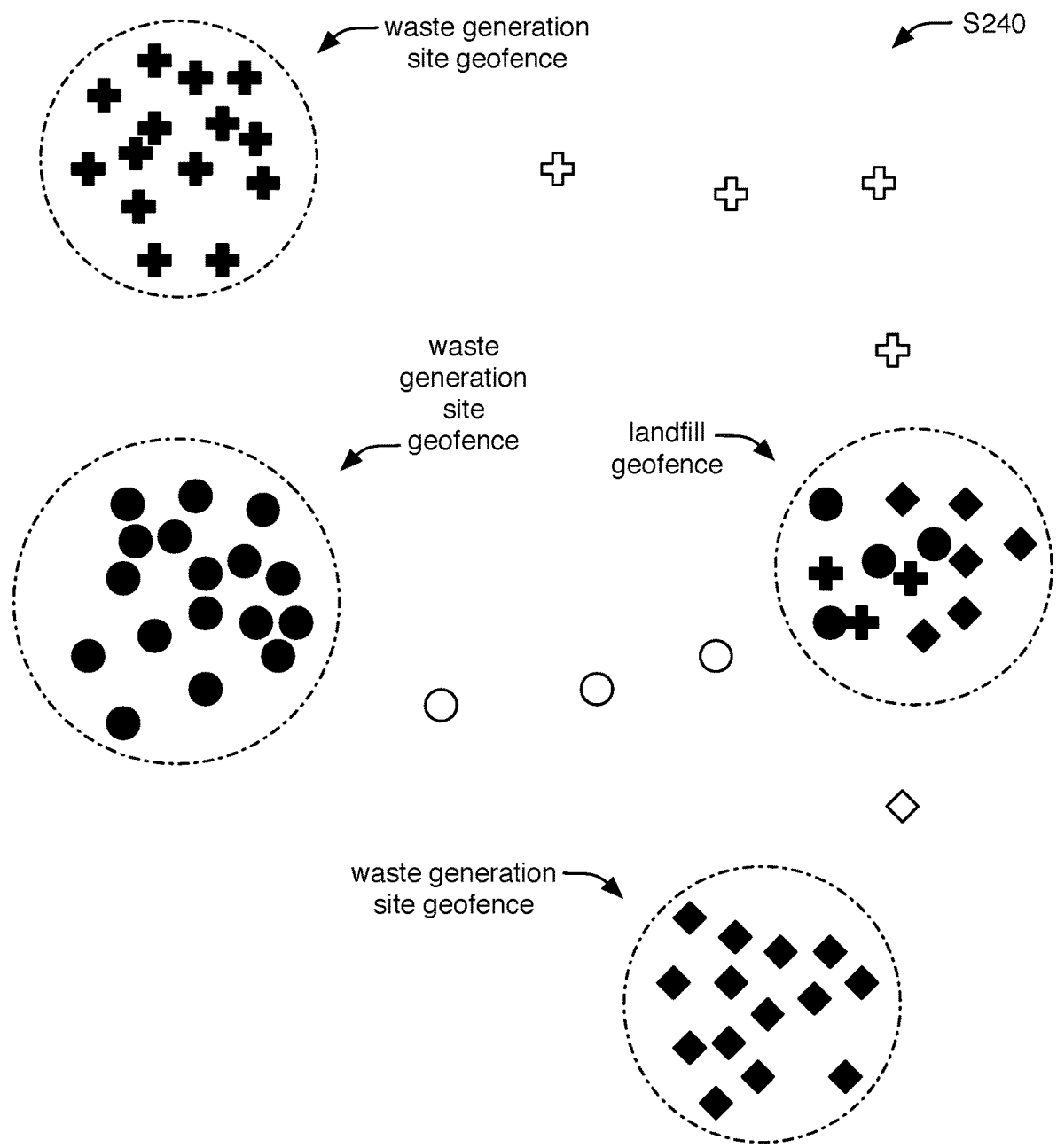
Figure 7:
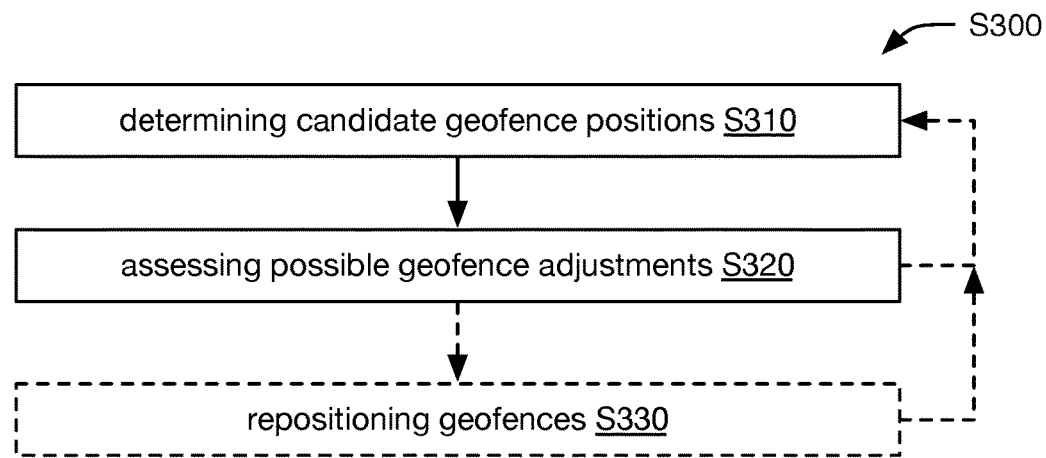
FIG. 7 is a flowchart representation of an embodiment of a third element of the method.

S200 preferably includes determining container-specific geofences S210 and/or determining additional geofences S220 (e.g., as shown in FIGS. 5A-5B and/or 6A-6D). S200 can optionally include merging geofences S230 and/or classifying geofences S240. However, S200 can additionally or alternatively include any other suitable elements performed in any suitable manner.

3.2.1 Determining Container-Specific Geofences.

For each container (or group of containers), S210 preferably includes determining a candidate geofence S211. The candidate geofence is preferably determined such as described above regarding S100, but can additionally or alternatively be determined in any other suitable manner. The candidate geofence is preferably determined using location data associated with the container (or group of containers) only. Preferably, data for a single container is used alone. However, S211 can alternatively be performed for a group of containers, such as a group determined based on historical co-location of the containers, shared association with one or more elements such as a customer, an assigned service location, and/or any other suitable information and/or grouping criteria. In examples in which containers are grouped, the groups are preferably mutually disjoint, but can alternatively share some or all elements.

S211 is preferably performed using a predetermined time interval (e.g., time intervals such as described above regarding S100), more preferably using the same time interval for each container (e.g., the most recent week of data). S211 preferably determines a circular region centered on the centroid of the associated cluster, but can additionally or alternatively determine any other suitable candidate geofences (e.g., having any suitable shapes and/or positions).

The set of containers (or set of groups of containers) preferably defines a bijective mapping onto the candidate geofences (and/or onto the container-specific geofences), wherein each candidate geofence is associated with (e.g., determined based on) a single container (or group of containers), and vice versa. However, the containers and geofences can additionally or alternatively define any other suitable mappings.

S210 preferably includes adjusting candidate geofence sizes S212. Adjusting candidate geofence sizes S212 preferably includes, for each geofence, increasing the geofence's size if (and preferably only if) it satisfies a growth criterion (e.g., determining whether the geofence satisfies the growth criterion and, if so, increasing its size). The growth criterion is preferably defined based on the distance from one or more points to the geofence. For example, if at least one point is outside the geofence but within a threshold distance (e.g., of the geofence border, of the geofence center, etc.), the growth criterion can be determined to be satisfied. Optionally, such a point will only satisfy the growth criterion if the point is not contained within any other geofence, but alternatively the growth criterion can be satisfied even if all such points are contained within one or more other geofences.

If the growth criterion is satisfied, increasing the geofence size preferably includes increasing the radius of the geofence, such as increasing the radius by the threshold distance, by another predefined distance, by the distance to the point, by an amount proportional to the distance to the point (e.g., no less than the distance to the point, such as 100, 105, 110, 115, 120, 125, 150, 200, 100-110, 110-125, 125-175, or 175-250% of the distance to the point, etc.). However, S212 can additionally alternatively include increasing the size in any other suitable manner.

For each geofence for which at least one point satisfied the growth criterion, S212 preferably includes repeating growth of that geofence (e.g., until no points satisfy the growth criterion). In one example, S212 can include: first, increasing the radius of each geofence by a predefined amount (e.g., fixed amount, amount proportional to each geofence's radius, etc.); then, if the radius increase did not cause the geofence to overlap any additional points, not increasing the geofence radius any further. In this example, S212 preferably includes repeating the incremental radius growth for each geofence that did grow to include one or more additional points.

Optionally, S212 can include merging candidate geofences (e.g., as described below regarding S230) before, during, and/or after performing S212.

However, S210 can additionally or alternatively include determining container-specific geofences in any other suitable manner.

3.2.2 Determining Additional Geofences.

Determining additional geofences S220 is preferably performed after S210, more preferably performed in response to completion of S210 (e.g., automatically in response, substantially immediately in response, etc.), but can additionally or alternatively be performed periodically, sporadically, in response to one or more triggers, and/or with any other suitable timing.

S220 is preferably performed based on the subset of points not contained within any already-determined geofences (e.g., container-specific geofences determined in S210). However, S220 can alternatively be performed based on a subset including some or all such points, performed based on a subset excluding some or all points not contained within geofences determined in S210, and/or performed based on any other suitable information.

S220 preferably includes performing clustering S221 and adjusting candidate geofence sizes S222. However, S220 can additionally or alternatively include any other suitable elements.

Performing clustering S221 preferably functions to determine additional candidate geofences (e.g., geofences in addition to the container-specific geofences determined in S210). S221 preferably includes performing centroid-based clustering (e.g., k-means, k-medoids, X-means, etc.), but can additionally or alternatively include using any other suitable clustering algorithm(s). The clustering is preferably performed using one or more parameters that tend toward determining a large number of clusters (e.g., large compared to the actual number of clusters; large compared to the number produced by typical clustering algorithms; comparable to a large number of clusters such as 100, 200, 500, 1000, 50-250, 200-800, or 500-2500 clusters; etc.). For example, k-means clustering can be performed using a large value of k. In a first example, k is set to a predefined number (e.g., 50, 100, 200, 300, 500, 30-75, 50-200, 100-300, or 300-1000, etc.). In a second example, k is set to a number determined based on the total number of points (e.g., number of points in the subset used for performing S220, total number of points used for performing S200 such as the total number of points in the dataset or datasets, etc.), such as using k equal to a threshold fraction of the total number of points (e.g., 5, 10, 15, 20, 25, 3-10, 5-20, 10-30, or 20-50%, etc.). In a variation of this example, k is set equal to the lesser of the threshold fraction and a predefined threshold (e.g., no more than 50, 100, 200, 300, 500, 30-75, 50-200, 100-300, or 300-1000, etc.). However, the clustering can be performed using any other suitable parameters.

S221 preferably generates a geofence based on each cluster (e.g., each cluster in the subset of points) satisfying one or more criteria (e.g., wherein the geofences are generated such as described above regarding S130). For example, the criteria can include one or more of: a minimum number of points in the cluster (e.g., four points, 10 points, etc.); a minimum point density; and/or any other suitable criteria. However, S221 can additionally or alternatively include determining any other suitable clusters.

Adjusting candidate geofence sizes S222 is preferably performed as described above regarding S212, but can additionally or alternatively be performed in any other suitable manner. S222 preferably includes only adjusting the sizes of geofences determined in S220, not those determined in S210 (e.g., because the sizes of the geofences determined in S210 have already been adjusted in S212). In some examples, one or more points may not lie within any of the geofences determined in S200 (e.g., container-specific geofences determined in S210, additional geofences determined in S220, etc.), even after adjusting the geofence sizes, whereas in other examples, all points are contained within at least one geofence.

3.2.3 Merging Geofences.

S200 can optionally include merging geofences S230. S230 preferably functions to ensure that there are no overlapping geofences (e.g., in the sets of container-specific geofences and additional geofences). S230 preferably includes selecting all geofences that satisfy a merge criterion, and merging these selected geofences. In one example, any overlap between two geofences satisfies the merge criterion (e.g., wherein those two overlapping geofences should be merged). Alternatively, the merge criterion can be satisfied by geofences that overlap by more than a threshold amount (e.g., absolute length of the overlapping region, such as 1, 2, 5, 10, 20, 50, 100, 1-5, 3-10, 5-20, 10-30, or 20-100 meters; absolute area of the overlapping region, such as 1, 2, 5, 10, 20, 50, 100, 200, 500, 1000, 1-5, 3-10, 5-20, 10-30, 20-100, 100-500, 200-1000, or 500-2000 square meters; relative amount, such as 1, 2, 5, 10, 25, 0-1, 1-3, 3-10, 10-30, or more than 30% of the radius or area of one of the overlapping geofences, such as of the larger or smaller geofence; etc.), can be satisfied by geofences with centers within a threshold distance of each other (e.g., absolute distance, such as 1, 2, 5, 10, 20, 50, 100, 1-5, 3-10, 5-20, 10-30, or 20-100 meters; relative distance, such as 1, 2, 5, 10, 25, 0-1, 1-3, 3-10, 10-30, or more than 30% of the radius of one of the overlapping geofences, such as of the larger or smaller geofence; etc.), and/or can include any other suitable criteria.

Merging geofences S230 preferably includes determining the shape of the resulting geofence. In a first example, this includes determining a region such as described above regarding S130 (e.g., using the points included in all geofences to be merged together). In a second example, the resulting geofence shape is equal to the union of the selected geofences to be merged. However, the resulting geofence can additionally or alternatively be determined in any other suitable manner.

S230 is preferably performed before adjusting geofence sizes (e.g., in S212 and/or S222), but can additionally or alternatively be performed during size adjustment (e.g., after each iterative growth, checking for overlap and merging geofences if the merge criterion is satisfied), after size adjustment, and/or with any other suitable timing. However, S230 can additionally or alternatively include merging geofences in any other suitable manner.

3.2.4 Classifying Geofences.

S200 can optionally include classifying geofences S240. S240 preferably functions to associate each geofence with a location type. S240 preferably includes classifying each geofence determined in S210 and/or S220, but can additionally or alternatively include classifying a subset thereof and/or classifying any other suitable geofences.

The geofences are preferably classified based on one or more criteria (e.g., associated with container location information, container metadata, etc.). The criteria can include, for example, the number of different containers at a location (e.g., within a geofence), the container fill level (i.e., fullness) over time (e.g., determined based on sensor measurements and/or analysis, such as described in U.S. patent application Ser. No. 16/570,936, titled "Method and System for Contamination Assessment" and filed 13 Sep. 2019 and/or in U.S. patent application Ser. No. 16/288,593, titled "System and Method for Waste Management" and filed 28 Feb. 2019, each of which is herein incorporated in its entirety by this reference; and/or determined in any other suitable manner), container residence time (e.g., residence time within the geofence and/or within a threshold region, such as a region larger or smaller than the geofence), other reported locations associated with the container such as the previous location measurement of the container, the container type such as front load or roll-off bin, user-provided data, and/or any other suitable information. The number of different containers at a location can include the number of different containers at any one time (e.g., the maximum number concurrently present, the average number concurrently present, and/or any other suitable metric of concurrently present containers), the total number of containers seen over a time interval (e.g., the same time interval as used in S210 or a different time interval), and/or any other suitable container count metric.

In one example, many unique containers, some or all of which exhibit a high rate of fill level reduction, can be indicative of a landfill type location; a few unique containers associated with a fill level increase (e.g., a slow rate of fill level increase) can be associated with a waste generation site location type; and/or many unique containers typically associated with negligible fill level changes can be indicative of a container depot location type.

The geofences can be classified using a random forest classifier and/or any other suitable classification tools. However, S240 can additionally or alternatively include classifying geofences in any other suitable manner.

S200 (e.g., S210 and/or S220) can optionally be performed based further on a set of predefined geofences (e.g., previously determined geofences, user defined geofences, etc.). For example, the predefined geofences can be added to the set of candidate geofences determined in S211. In some examples, the predefined geofences are protected from alteration (e.g., not merged with other geofences, not changed in size, and/or shape, etc.). In a specific example, if a predefined geofence and another geofence satisfy the merge criterion, the other geofence can be deleted, retained without merging, and/or treated in any other suitable manner, while the predefined geofence is not altered. Alternatively, the predefined geofences can be allowed to be changed in some or all manners described above (e.g., merged with other geofences, adjusted in size and/or shape, etc.), such as being treated in a manner substantially identical to the other geofences.

However, S200 can additionally or alternatively include determining the set of geofences in any other suitable manner.

3.3 Adjusting Geofence Positions.

Adjusting geofence positions S300 preferably functions to reposition one or more geofences (e.g., to better overlap location data). For example, S300 can function to improve positioning of user-specified geofences, to adapt to location measurement artifacts (and/or changes thereto), and/or improve geofence positioning in any other suitable manner. S300 preferably includes: determining candidate geofence positions S310; assessing possible geofence adjustments S320; and/or repositioning geofences S330 (e.g., as shown in FIGS. 7, 8A-8E, and/or 9A-9E). However, S300 can additionally or alternatively include any other suitable elements performed in any suitable manner. S300 is preferably performed periodically (e.g., daily, weekly, every 1, 2, 4, 7, 15, 30, 0.1-1, 1-5, 3-10, or 10-30 days, etc.), but can additionally or alternatively be performed sporadically, performed a single time, performed in response to one or more triggers (e.g., receipt of new data such as new location data, definition of new geofences, addition of new containers and/or location sensors to the system, etc.), and/or performed with any other suitable timing.

3.3.1 Determining Candidate Geofence Positions.

Figure 8A:
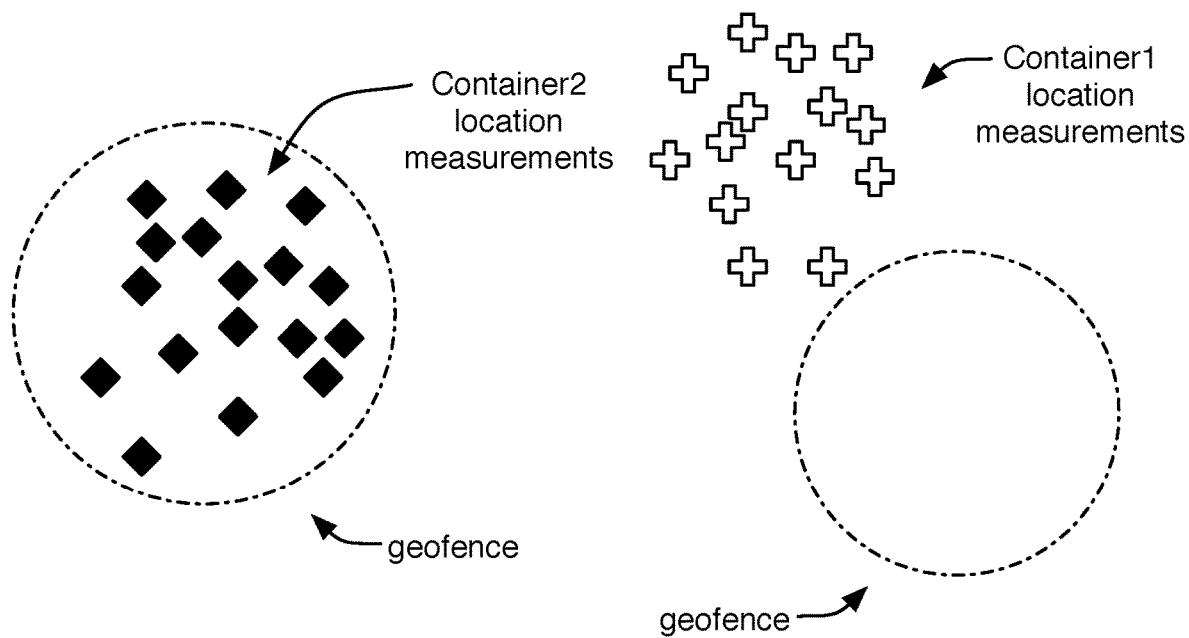
FIG. 8A is a schematic representation of a third example of a location dataset.
Figure 8B:
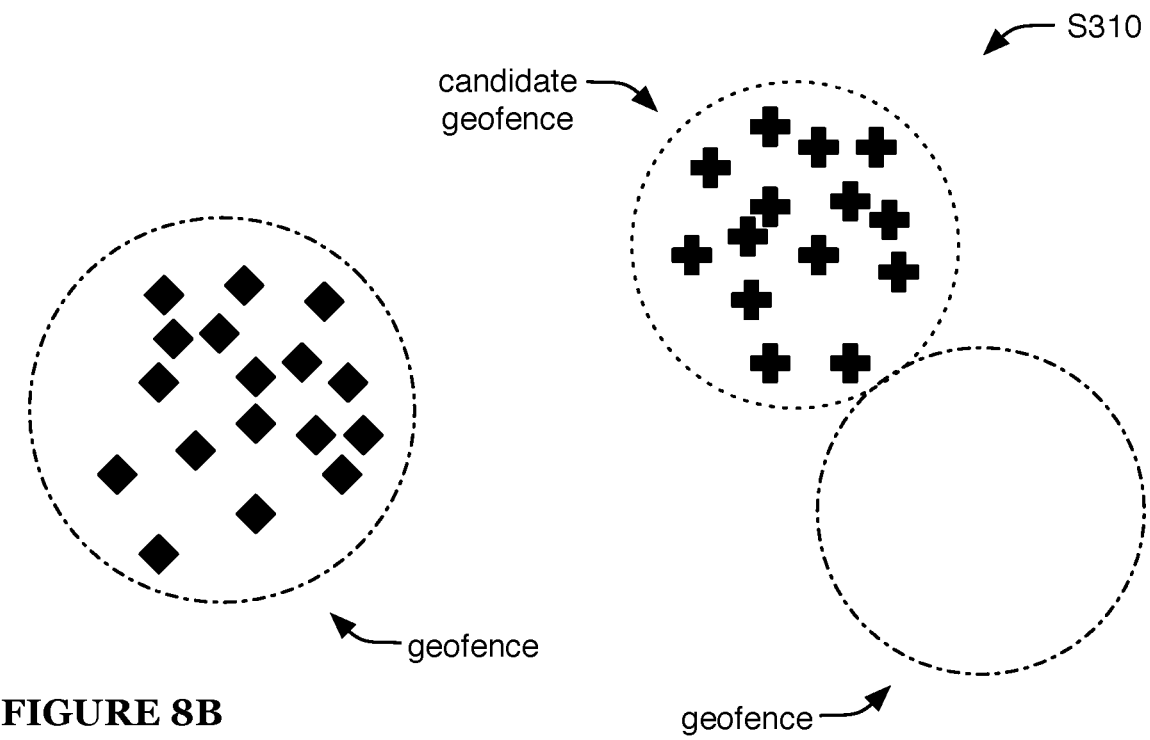
FIGS. 8B-8E are schematic representations of various portions of a first example of the third element of the method.

Determining candidate geofence positions S310 preferably includes, for each geofence, determining the candidate geofence position such as described above regarding S100 (e.g., determining the candidate geofence center such as described above regarding S130), such as shown by way of examples in FIGS. 8B and/or 9A. S310 is preferably performed for each container (e.g., each container of the system, each container represented in the location data, etc.), or for each container associated with one or more location data points satisfying a distance-based criterion (e.g., within a threshold distance from a particular geofence; within a threshold distance from one or more geofences of a set, such as all geofences considered for adjustment in S300; etc.).

S310 can optionally include merging candidate geofences. For example, if two candidate geofence positions are within a threshold distance (e.g., 1, 2, 5, 10, 20, 50, 100, 1-5, 3-10, 5-20, 10-30, or 20-100 meters, etc.), S310 can include combining location points from the two candidate geofence positions and determining a new geofence position using the combined data (e.g., as described above regarding S100). In this example, if two or more candidate positions are merged, both (or all) original candidate positions are preferably discarded (and the new candidate position is preferably retained in their place). However, S310 can additionally or alternatively include determining the candidate geofence position in any other suitable manner.

3.3.2 Assessing Possible Geofence Adjustments.

Figure 8C:
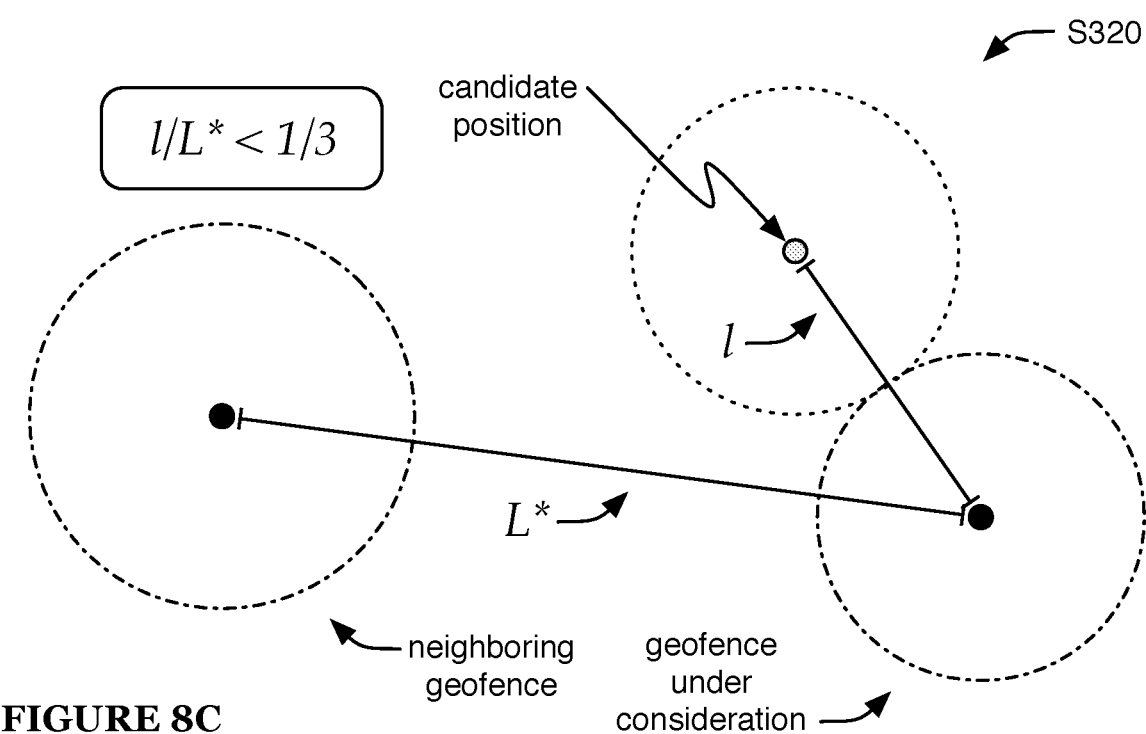
Figure 8D:
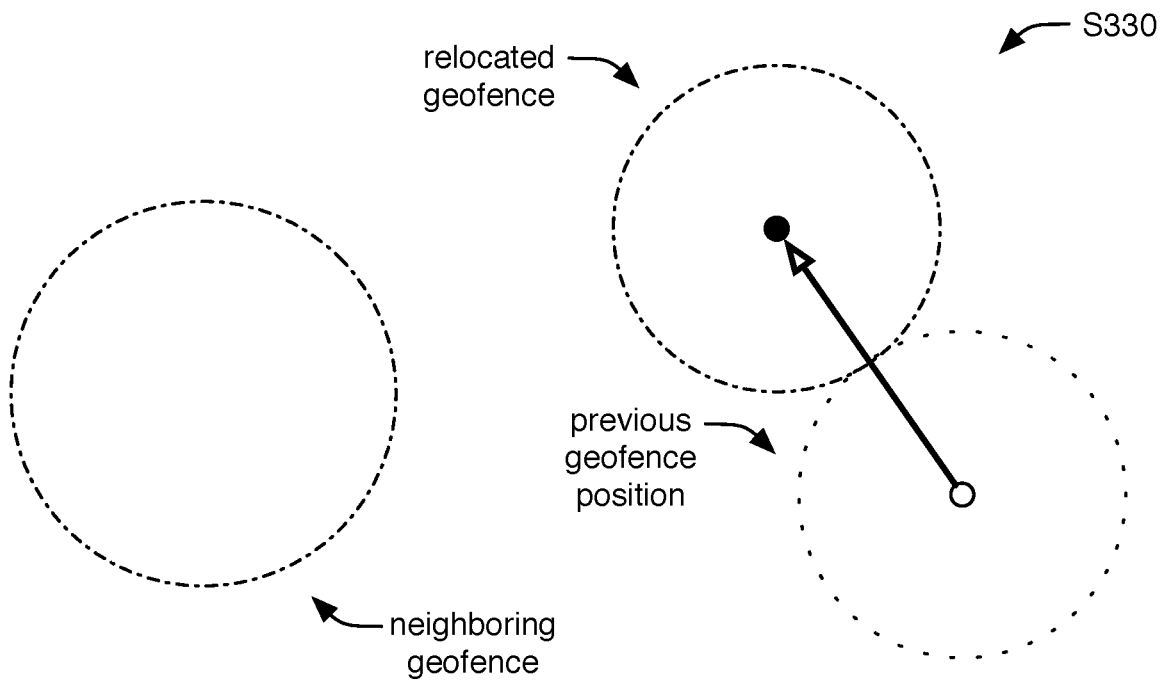
Figure 8E:
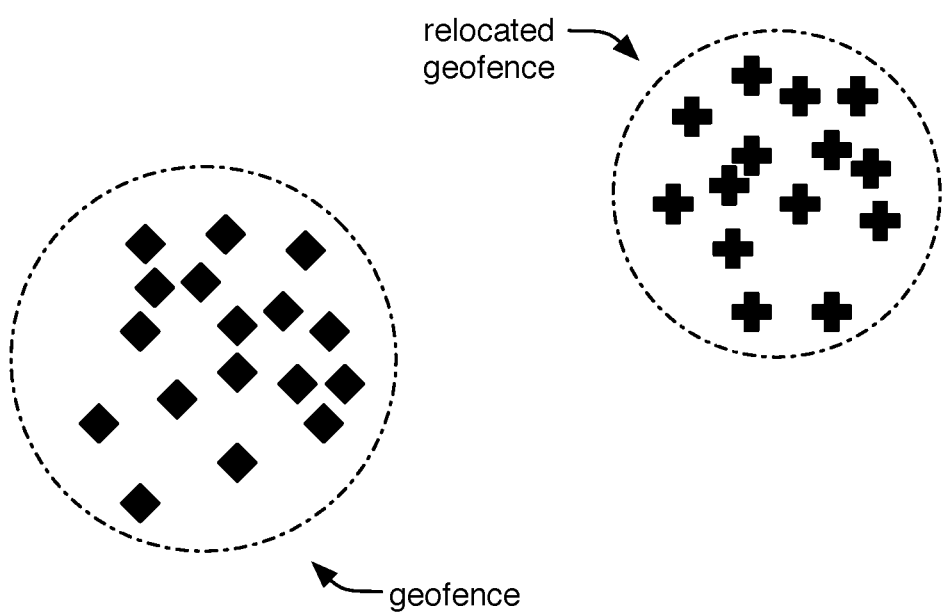
Figure 9A:
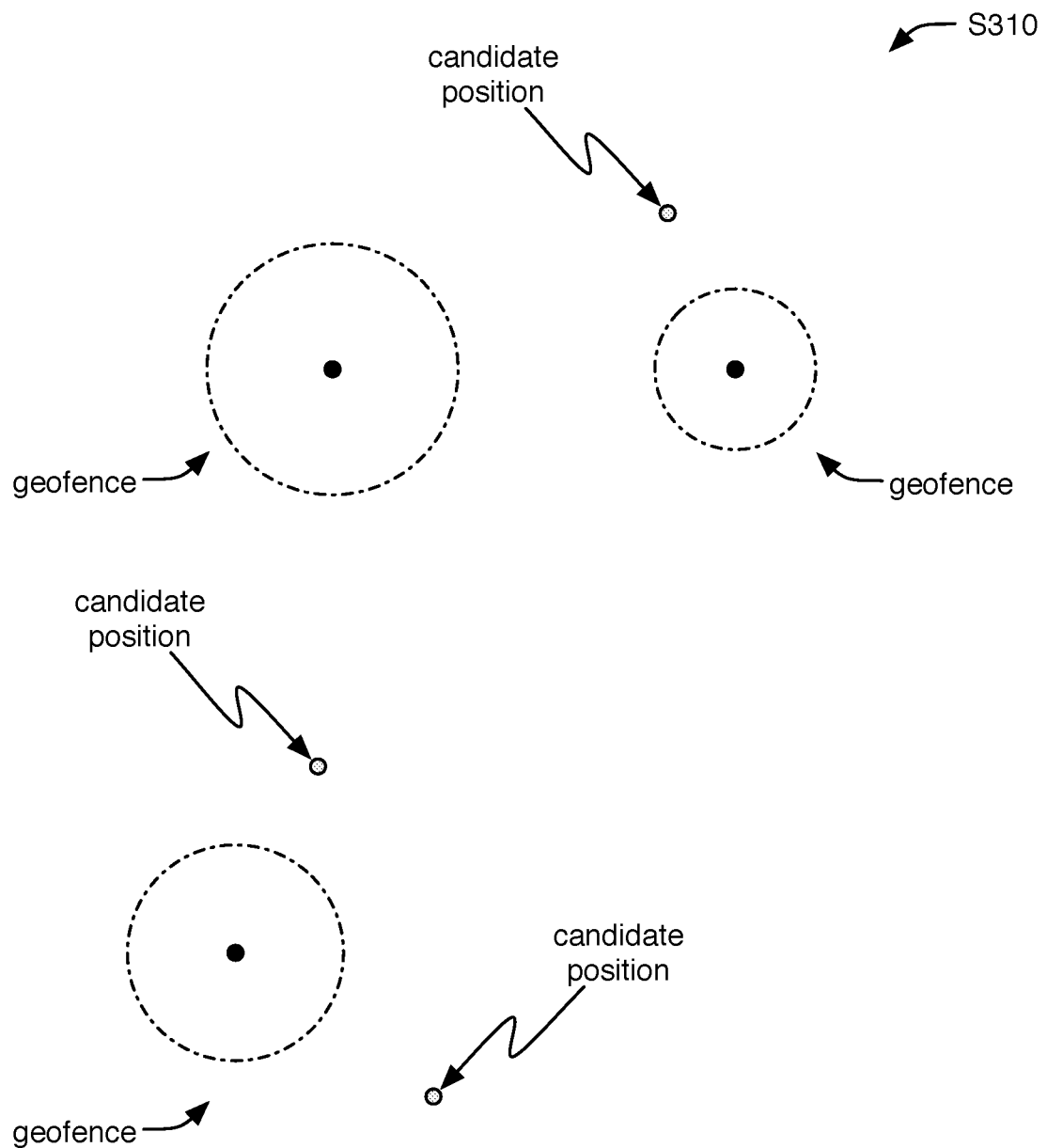
FIGS. 9A-9E are schematic representations of various portions of a second example of the third element of the method.
Figure 9B:
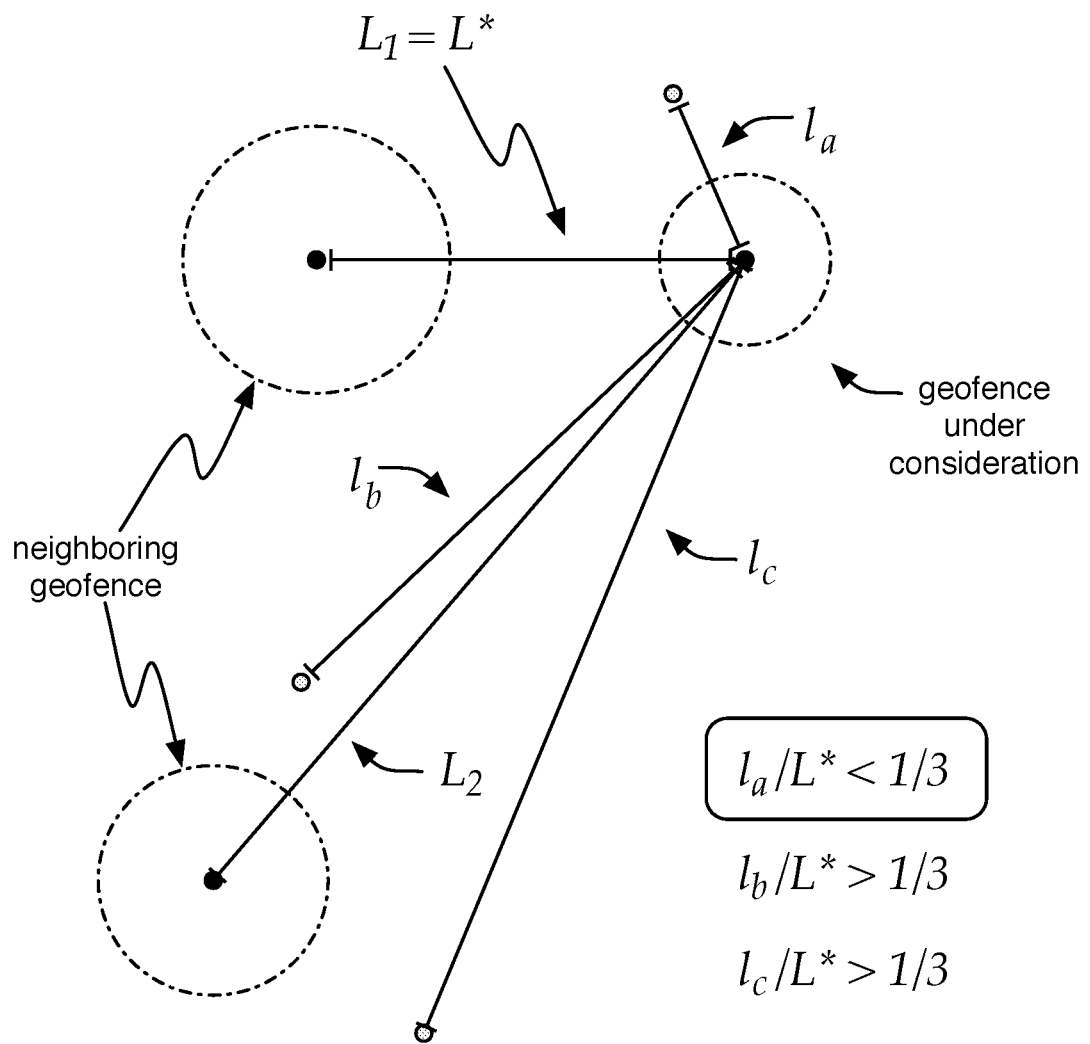
Figure 9C:
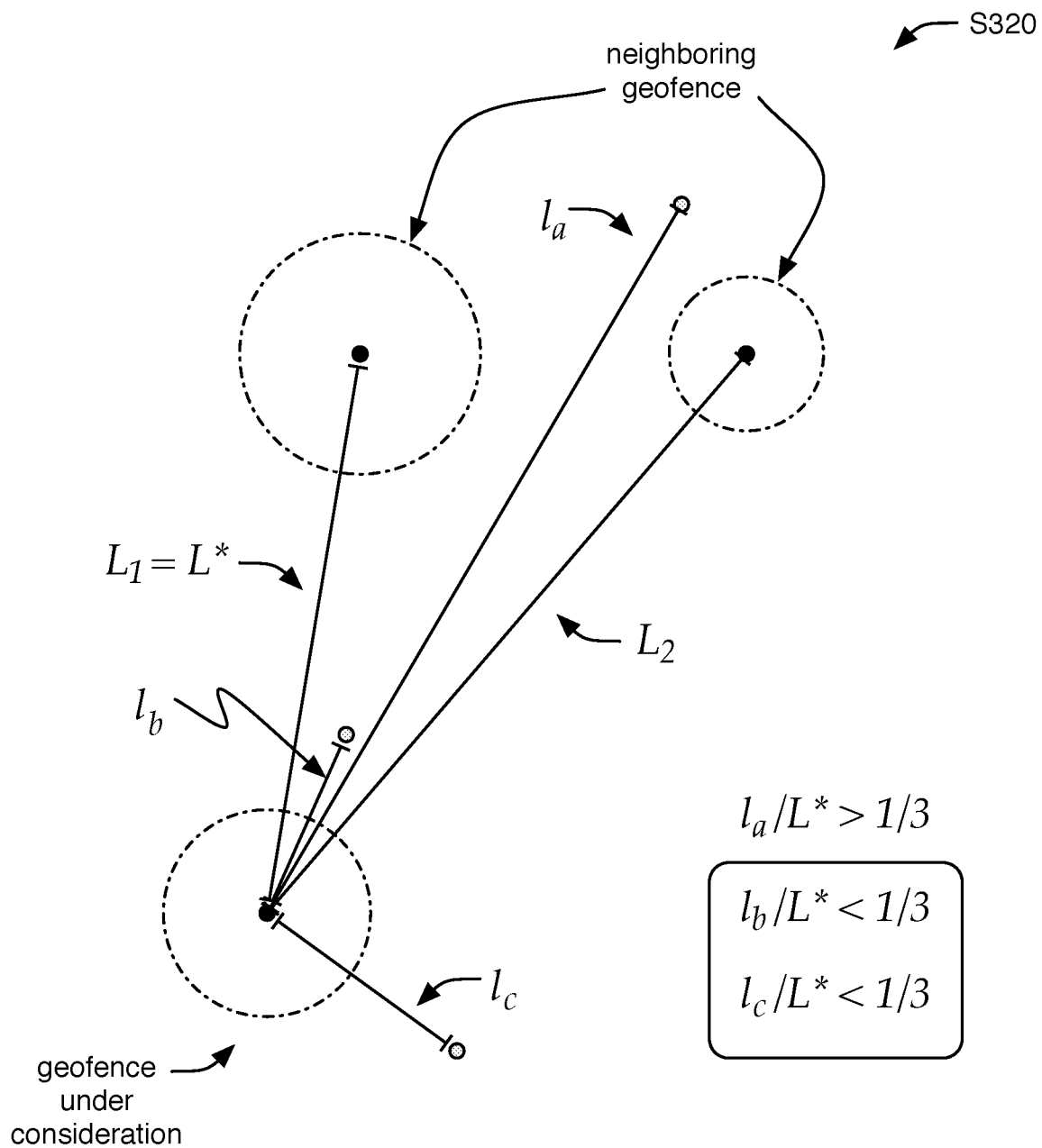
Figure 9D:
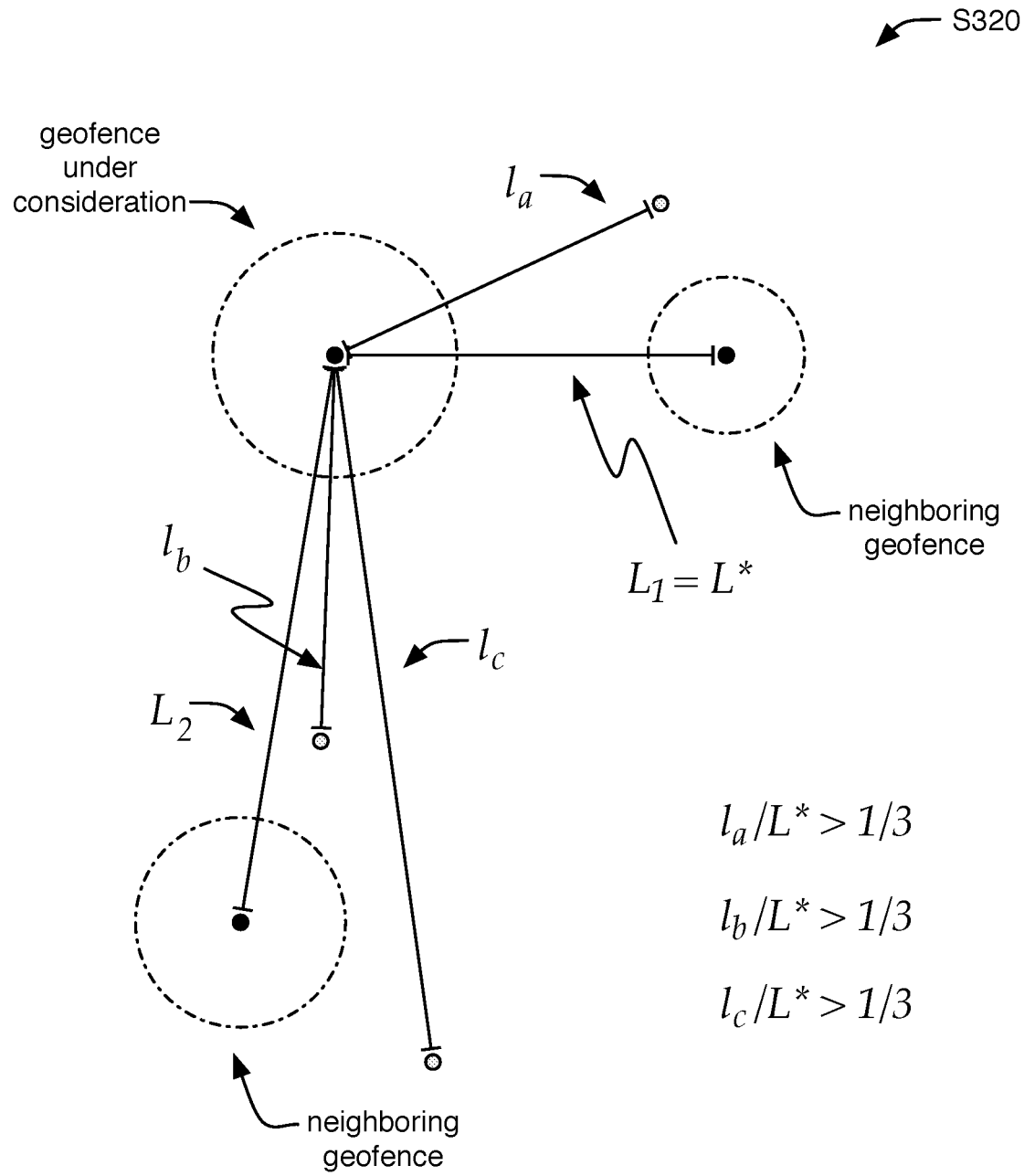
Figure 9E:
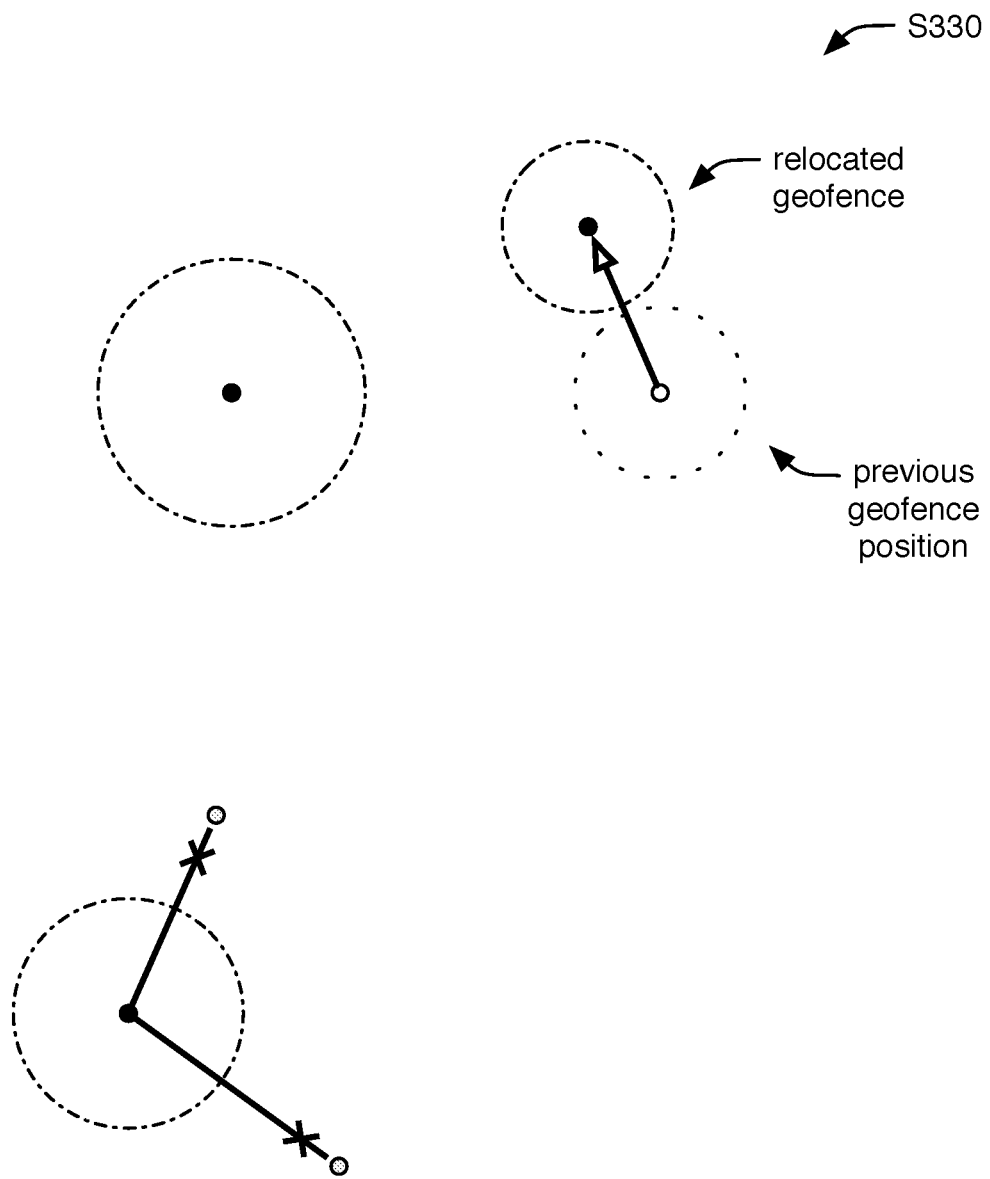

Assessing possible geofence adjustments S320 is preferably performed for each geofence, but can alternatively be performed for a subset of the geofences and/or for any other suitable geofences (e.g., as shown by way of examples in FIGS. 8C and/or 9B-9D). S320 preferably includes determining a distance l between the geofence (e.g., the geofence center) and each candidate position. S320 preferably includes (e.g., after determining the distance l) determining a subset of candidate positions for which the distance l is within a threshold range. For example, the maximum distance of the threshold range is preferably proportional to the geofence size (e.g., 0.1, 0.2, 0.5, 1, 1.5, 2, 2.5, 3, 4, 5, 10, 0.1-0.3, 0.3-1, 1-1.5, 1.5-2, 2-3, 3-5, or 5-15 times the geofence radius, etc.), but can additionally or alternatively include an absolute value (e.g., 0.1, 0.2, 0.3, 0.5, 0.75, 1, 2, 3, 5, 7.5, 10, 0.02-0.1, 0.1-0.2, 0.2-0.5, 0.5-1, 1-2, 2-5, 5-10, or 10-50 kilometers, etc.), and/or include any other suitable maxima. The minimum distance can be zero (e.g., wherein no minimum limit is imposed), can be a distance proportional to geofence size (e.g., 2, 5, 10, 20, 30, 50, 75, 100, 150, 1-3, 3-10, 10-20, 20-50, 50-100, or 100-200% of the geofence radius, etc.), an absolute distance (e.g., 0.01, 0.02, 0.03, 0.05, 0.075, 0.1, 0.2, 0.3, 0.5, 0.75, 1, 3, 10, 30, 0.002-0.01, 0.01-0.02, 0.02-0.05, 0.05-0.1, 0.1-0.2, 0.2-0.5, 0.5-1, 1-5, or 5-50 kilometers, etc.), and/or any other suitable threshold minima. However, the subset of candidate positions can additionally or alternatively be determined based on any other suitable criteria.

For each position of the subset, S320 preferably includes selecting a neighboring geofence, and can include determining a distance $L_i$ associated with the neighboring geofence, wherein $L_i$ is defined as the distance from the geofence under consideration to the neighboring geofence. In particular, the neighboring geofence selected in S320 is preferably the closest geofence to the geofence under consideration; i.e., the geofence for which $L_i$ is the shortest (wherein this shortest $L_i$, corresponding to the neighboring geofence selected in S320, is denoted as L*), such as shown by way of examples in FIGS. 8C and/or 9B-9D. However, S320 can additionally or alternatively include determining a neighboring geofence in any other suitable manner.

S320 preferably includes (e.g., after selecting a neighboring geofence for each position of the subset) filtering the candidate positions, such as based on a distance ratio. For example, selecting the position as a tentative new position for the geofence if it satisfies the criterion that l/L* is less than a threshold value (e.g., 0.1, 0.2, 0.25, 0.3, ⅓, 0.4, 0.5, 0.05-0.1, 0.1-0.2, 0.2-0.3, 0.3-0.4, 0.4-0.5, etc.). In this example, if l/L* for a particular position is greater than or equal to the threshold value, that position is preferably not selected as a tentative new position. However, S320 can additionally or alternatively include assessing possible geofence adjustments in any other suitable manner.

3.3.3 Repositioning Geofences.

Repositioning geofences S330 is preferably performed after (e.g., in a response to performing) S320. If a candidate position is selected as a tentative new position for more than one geofence (e.g., in S320), S330 preferably does not include changing the position of any such geofences for which that candidate position is selected as a tentative new position. For all other geofences, if the geofence is associated with exactly one tentative position, S330 preferably includes moving the geofence (e.g., changing the geofence center) to the associated tentative new position (e.g., as shown by way of examples in FIGS. 8D-8E and/or 9E). If a geofence is associated with more than one tentative new position, the geofence's position is preferably not changed.

However, S300 can additionally or alternatively include adjusting geofence positions in any other suitable manner, and/or the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for location analysis, comprising:
   receiving a set of initial geofences, each initial geofence of the set defining a respective position in a space and a respective shape;
   determining a plurality of candidate geofence positions in the space;
   for each initial geofence of the set:
     selecting a neighboring geofence from the set of initial geofences;
     based on the initial geofence and the neighboring geofence, selecting, from the plurality of candidate geofence positions, a respective set of candidate geofence positions; and
     if the respective set of candidate geofence positions consists of a single candidate geofence position, adding the initial geofence to an eligible subset of geofences;
   based on the respective sets of candidate geofence positions, determining an eligible subset of candidate geofence positions, wherein no candidate geofence position of the eligible subset of candidate geofence positions is included in more than one respective set of candidate geofence positions; and
   for each geofence of the eligible subset of geofences, if the respective single candidate geofence position is included in the eligible subset of candidate geofence positions, relocating the geofence position to the respective single candidate geofence position, wherein, for a first geofence of the eligible subset of geofences, the respective single candidate geofence position is included in the eligible subset of candidate geofence positions.

2. The method of claim 1, wherein:
   the neighboring geofence is selected based on a distance $L^*$ between the initial geofence and the neighboring geofence; and
   the respective set of candidate geofence positions is selected such that a distance from the initial geofence to each candidate geofence position of the respective set is less than a respective threshold distance, wherein the respective threshold distance is determined based on the distance $L^*$.

3. The method of claim 2, wherein the distance $L^*$ is defined between a center of the initial geofence and a center of the neighboring geofence.

4. The method of claim 2, wherein, for each initial geofence of the set, the respective set of candidate geofences is selected such that a distance from the initial geofence to each candidate geofence of the respective set is less than a respective threshold distance.

5. The method of claim 4, wherein, for each initial geofence of the set, the respective threshold distance is determined based on the distance $L^*$.

6. The method of claim 5, wherein, for each initial geofence of the set, the respective threshold distance is less than $L^*/2$.

7. The method of claim 1, further comprising receiving a location dataset comprising a set of locations in the space, wherein the plurality of candidate geofence positions is determined based on the set of locations.

8. The method of claim 7, wherein:
   the set of locations comprises an unassigned subset, wherein each location of the unassigned subset is not enclosed by any initial geofence of the set;
   the method further comprises, after relocating the geofence positions, based on the unassigned subset, determining a third set of geofences;
   each geofence of the third set defines a respective position in the space and a respective shape; and
   each geofence of the third set encloses a respective plurality of locations of the unassigned subset.

9. The method of claim 7, wherein:
   the set of locations comprises a plurality of subsets, each subset associated with a different container of a plurality of containers; and
   determining the plurality of candidate geofences comprises, for each subset of the plurality of subsets:
     based on the subset, selecting an initial position;
     based on the initial position, selecting a cluster of locations of the subset; and
     determining a respective candidate geofence of the plurality based on the cluster of locations of the subset.

10. The method of claim 7, wherein the set of locations comprises a plurality of subsets, each subset associated with a different container of a plurality of containers, wherein the plurality of containers comprises a dumpster.

11. The method of claim 10, wherein the first geofence is associated with a waste generation site.

12. The method of claim 11, wherein a second geofence of the set of initial geofences is associated with a waste disposal site.

13. The method of claim 7, wherein the set of locations comprises a plurality of subsets, each subset associated with a different container of a plurality of containers, wherein the plurality of containers comprises an intermodal freight container.

14. The method of claim 1, further comprising:
   receiving a location dataset comprising a set of locations in the space, the set of locations comprising a plurality of subsets, each subset associated with a different container of a plurality of containers; and
   based on the set of locations, determining a location type for a geofence in the space.

15. The method of claim 14, wherein the set of initial geofences comprises the geofence.

16. The method of claim 14, wherein the location type is a waste generation location.

17. The method of claim 14, wherein the location type is a waste disposal location.

18. The method of claim 14, wherein the location type is a container depot location.

19. The method of claim 14, wherein determining the location type is performed based on a first subset of the set of locations, wherein a location of the first subset is located within the geofence.

20. The method of claim 19, wherein the first subset is associated with a first container, wherein determining the location type is performed based further on metadata associated with the first container.

21. The method of claim 20, wherein the metadata comprises a time series indicative of a first container fill level.

* * * * *